United States Patent
Katsu et al.

(10) Patent No.: US 9,162,289 B2
(45) Date of Patent: Oct. 20, 2015

(54) MACHINE TOOL APPARATUS AND METHOD

(75) Inventors: Yoshiya Katsu, Florence, KY (US);
Koichi Kawamura, Florence, KY (US);
Jimmie Couch, Burlington, KY (US);
Mark Hadley, Union, KY (US)

(73) Assignee: Mazak Corporation, Florence, KY (US)

( * ) Notice: Subject to any disclaimer, the term of this patent is extended or adjusted under 35 U.S.C. 154(b) by 377 days.

(21) Appl. No.: 13/230,770

(22) Filed: Sep. 12, 2011

(65) Prior Publication Data

US 2013/0061726 A1    Mar. 14, 2013

(51) Int. Cl.
*B23B 23/00*    (2006.01)
*B23B 3/06*    (2006.01)
*B23B 5/08*    (2006.01)
*B23B 27/00*    (2006.01)
*B23B 29/04*    (2006.01)

(52) U.S. Cl.
CPC ... *B23B 3/06* (2013.01); *B23B 5/08* (2013.01); *B23B 23/00* (2013.01); *B23B 27/007* (2013.01); *B23B 29/04* (2013.01); *Y10T 82/10* (2015.01); *Y10T 82/2508* (2015.01); *Y10T 82/2564* (2015.01)

(58) Field of Classification Search
USPC ......... 29/27 R, 27 C; 82/1.11, 121, 129, 148, 82/150, 151, 162, 164
IPC .................................. B23B 23/00,23/02, 23/04
See application file for complete search history.

(56) References Cited

U.S. PATENT DOCUMENTS

| | | |
|---|---|---|
| 314,574 A | 3/1885 | Hadley |
| 318,261 A | 5/1885 | Kelley |
| 336,362 A | 2/1886 | Walker |
| 440,319 A | 11/1890 | Mackintosh |
| 441,834 A | 12/1890 | Freeman |
| 527,907 A | 10/1894 | Tucker |
| 630,876 A | 8/1899 | Force |
| 686,534 A | 11/1901 | Rearwin |
| 777,181 A | 12/1904 | Cheney |
| 871,662 A | 11/1907 | Aylesworth |

(Continued)

FOREIGN PATENT DOCUMENTS

JP    2001287101 A  * 10/2001

OTHER PUBLICATIONS

English machine translation of JP 2001287101 A, Oct. 2001.*

*Primary Examiner* — Daniel Howell
*Assistant Examiner* — Alan Snyder
(74) *Attorney, Agent, or Firm* — Fitch, Even, Tabin & Flannery LLP

(57) ABSTRACT

A machine tool apparatus and method for exterior and interior cutting operations on a workpiece is provided. In one form, the machine tool apparatus has a common support assembly with a tailstock and a boring tool holder mounted thereto. The common support assembly has a common support carriage that is mounted to a machine base for travel along a longitudinal axis parallel to a central axis of the workpiece. The tailstock and boring tool holder are mounted to a mounting base portion for travel transverse to the workpiece central axis. In one form, a turret having external cutting tools is separate from the boring tool holder and mounted to the machine base for performing external cutting operations on the workpiece. This separate mounting allows the turret to machine the exterior of the workpiece while also permitting a longer boring tool to perform deep internal cutting operations on the workpiece.

24 Claims, 14 Drawing Sheets

(56) References Cited

U.S. PATENT DOCUMENTS

| | | | |
|---|---|---|---|
| 889,711 | A | 6/1908 | McCarthy |
| 940,301 | A | 11/1909 | Carlborg |
| 944,876 | A | 12/1909 | Key |
| 968,489 | A | 8/1910 | Milne |
| 1,000,914 | A | 8/1911 | Jack |
| 1,049,694 | A | 1/1913 | Fried |
| 1,061,891 | A | 5/1913 | Wicks et al. |
| 1,227,486 | A | 5/1917 | Newman et al. |
| 1,391,034 | A | 9/1921 | Williams |
| 1,442,079 | A | 1/1923 | Lowe |
| 1,718,279 | A | 6/1929 | Dwyer |
| 1,772,940 | A | 8/1930 | Forsberg |
| 1,907,961 | A | 5/1933 | Guillet |
| 2,285,069 | A | 6/1942 | Vickers |
| 2,308,990 | A | 1/1943 | Mellon |
| 2,331,385 | A | 10/1943 | Fritzsch |
| 2,370,286 | A | 2/1945 | Berger |
| 2,390,888 | A | 12/1945 | Liber |
| 2,453,825 | A | 11/1948 | Wright |
| 2,507,155 | A | 5/1950 | Gruen et al. |
| 2,546,687 | A | 3/1951 | Brandenburg |
| 2,600,829 | A | 6/1952 | Arengo |
| 2,606,034 | A | 8/1952 | Heldenbrand |
| 2,607,105 | A | 8/1952 | Barkus |
| 2,619,993 | A | 12/1952 | Lombard, Jr. |
| 2,783,664 | A | 3/1957 | Johnson |
| 2,833,546 | A | 5/1958 | Johnson |
| 2,944,454 | A | 7/1960 | Vasselli |
| 3,014,391 | A | 12/1961 | Fuhrman |
| 3,258,997 | A | 7/1966 | Krisovitch |
| 3,600,988 | A | 8/1971 | Davis et al. |
| 3,691,613 | A | 9/1972 | Walk |
| 3,725,987 | A | 4/1973 | Kurimoto et al. |
| 3,785,227 | A | 1/1974 | Wolff |
| 3,796,116 | A | 3/1974 | Spreitzer |
| 3,981,211 | A | 9/1976 | Turner |
| 4,006,518 | A | 2/1977 | Rudolph et al. |
| 4,051,750 | A | 10/1977 | Berly |
| 4,180,894 | A | 1/1980 | Link |
| 4,308,771 | A | 1/1982 | Windle |
| 4,321,845 | A | 3/1982 | Szabo et al. |
| 4,339,857 | A | 7/1982 | Dickinson |
| 4,450,737 | A | 5/1984 | Hitt |
| 4,535,660 | A | 8/1985 | Osterman |
| 4,719,676 | A * | 1/1988 | Sansone ........................ 29/27 A |
| 4,881,309 | A * | 11/1989 | Sansone ........................ 29/27 A |
| 4,949,443 | A | 8/1990 | Saruwatari et al. |
| 4,995,434 | A | 2/1991 | Christiansen |
| 5,239,901 | A | 8/1993 | Lin |
| 5,282,402 | A | 2/1994 | Cady et al. |
| 5,778,504 | A * | 7/1998 | Ozawa et al. ................. 29/27 C |
| 5,787,560 | A | 8/1998 | Schalles |
| 5,964,016 | A | 10/1999 | Ito et al. |
| 6,705,185 | B2 | 3/2004 | Bruggemann |
| 6,836,941 | B2 | 1/2005 | Prust et al. |
| 6,874,213 | B2 | 4/2005 | Prust et al. |
| 6,948,411 | B2 * | 9/2005 | Grossmann ..................... 82/129 |
| 7,032,484 | B2 * | 4/2006 | Kobayashi et al. ............. 82/129 |
| 7,137,939 | B2 | 11/2006 | Ueda |
| 7,316,173 | B2 | 1/2008 | English |

\* cited by examiner

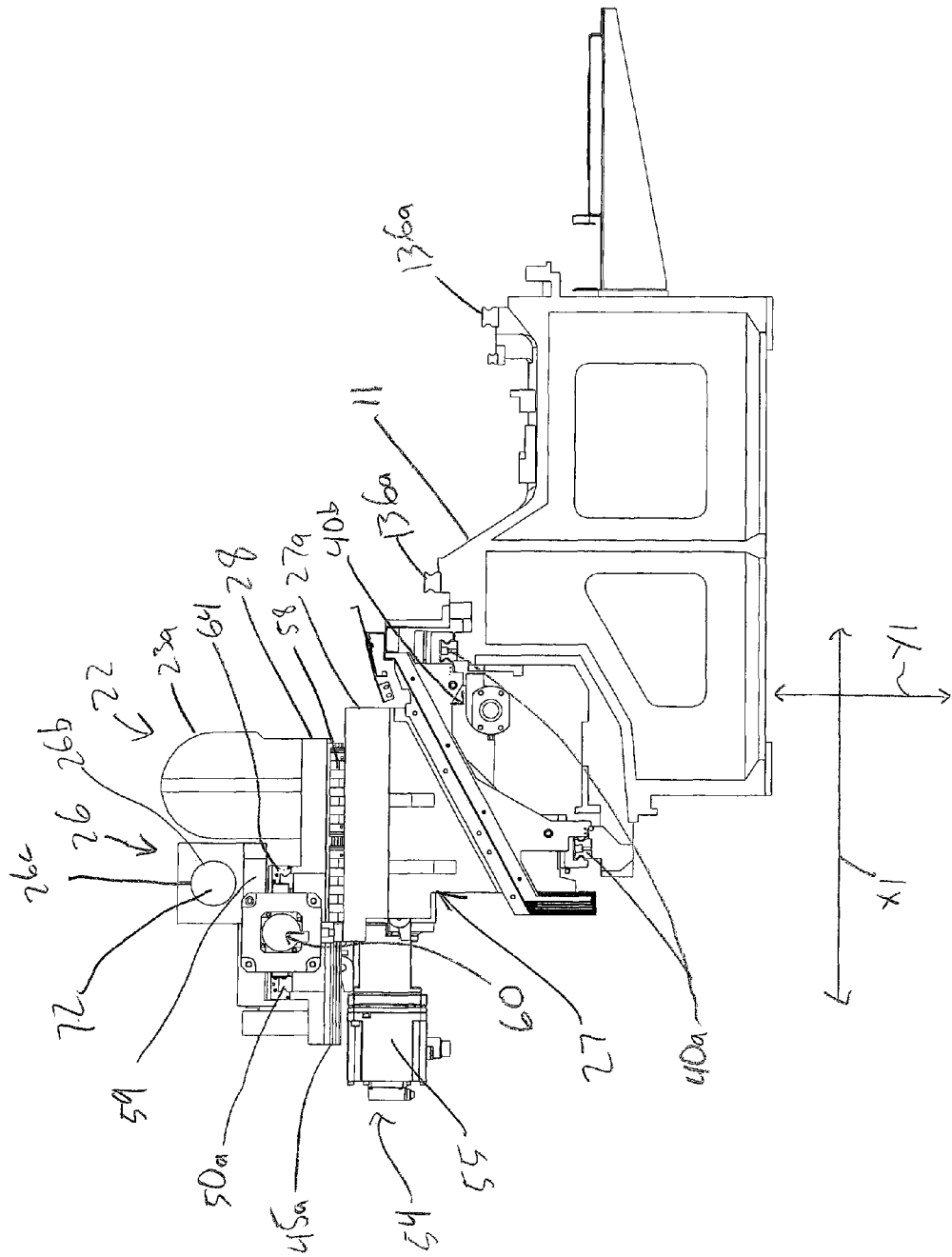

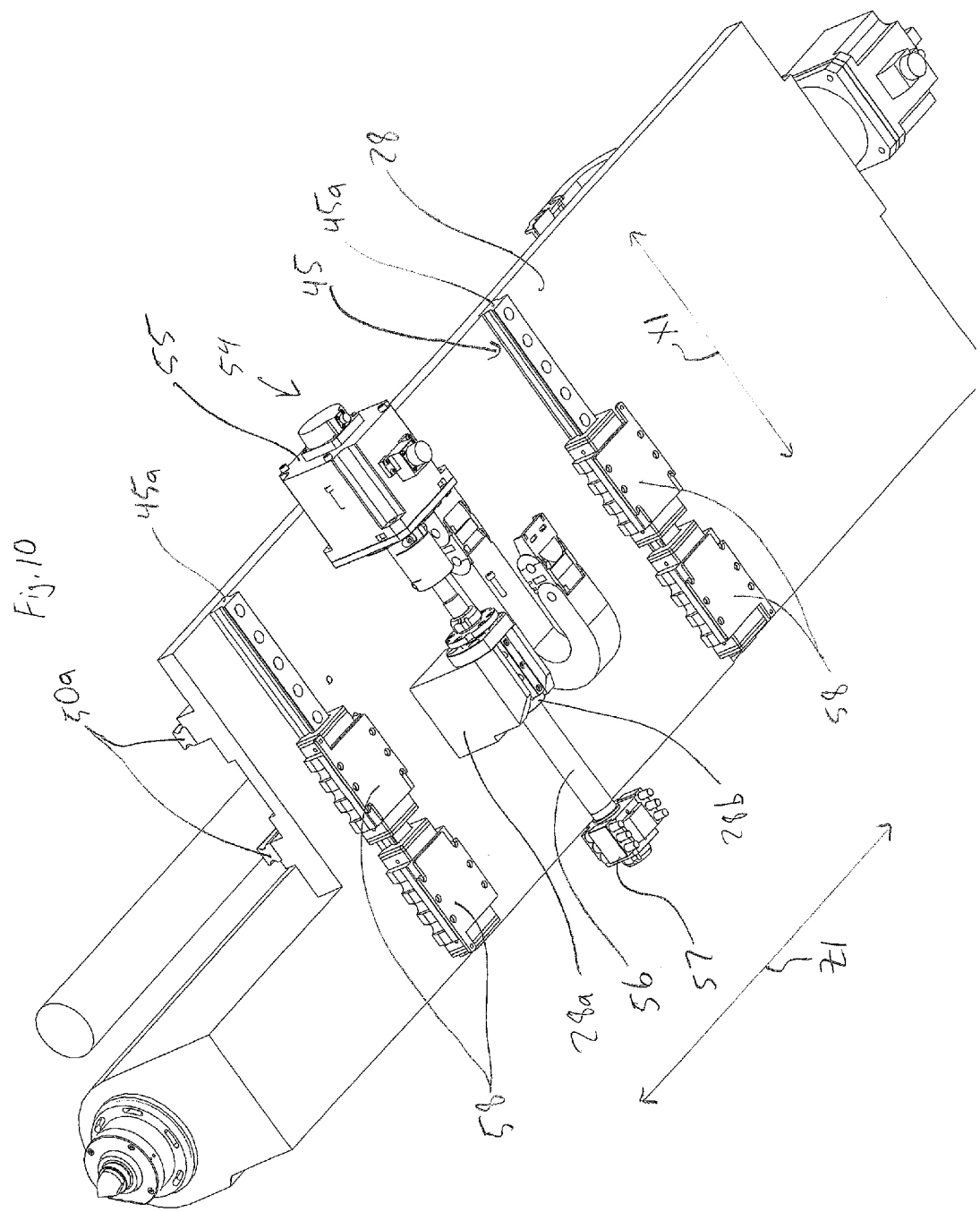

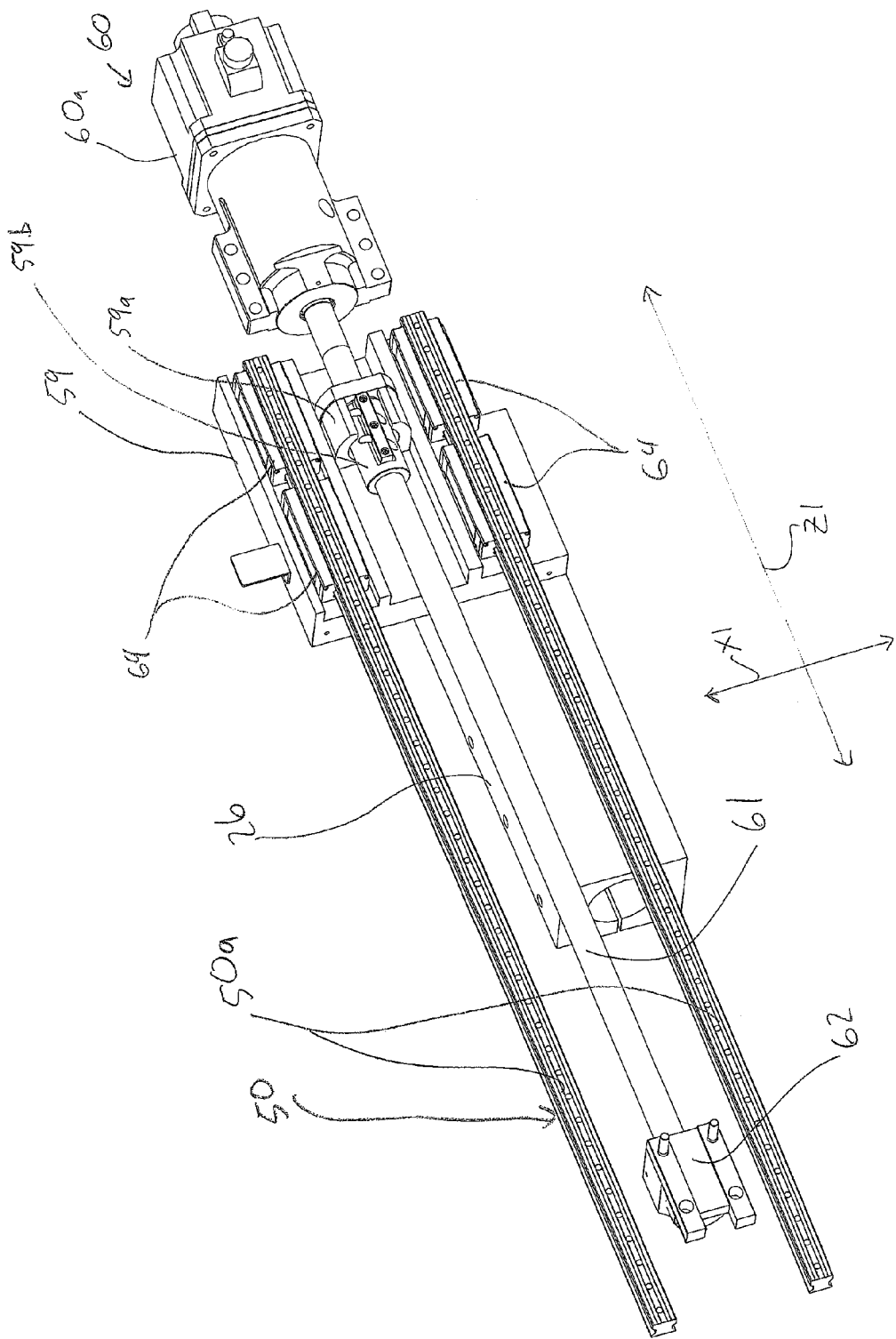

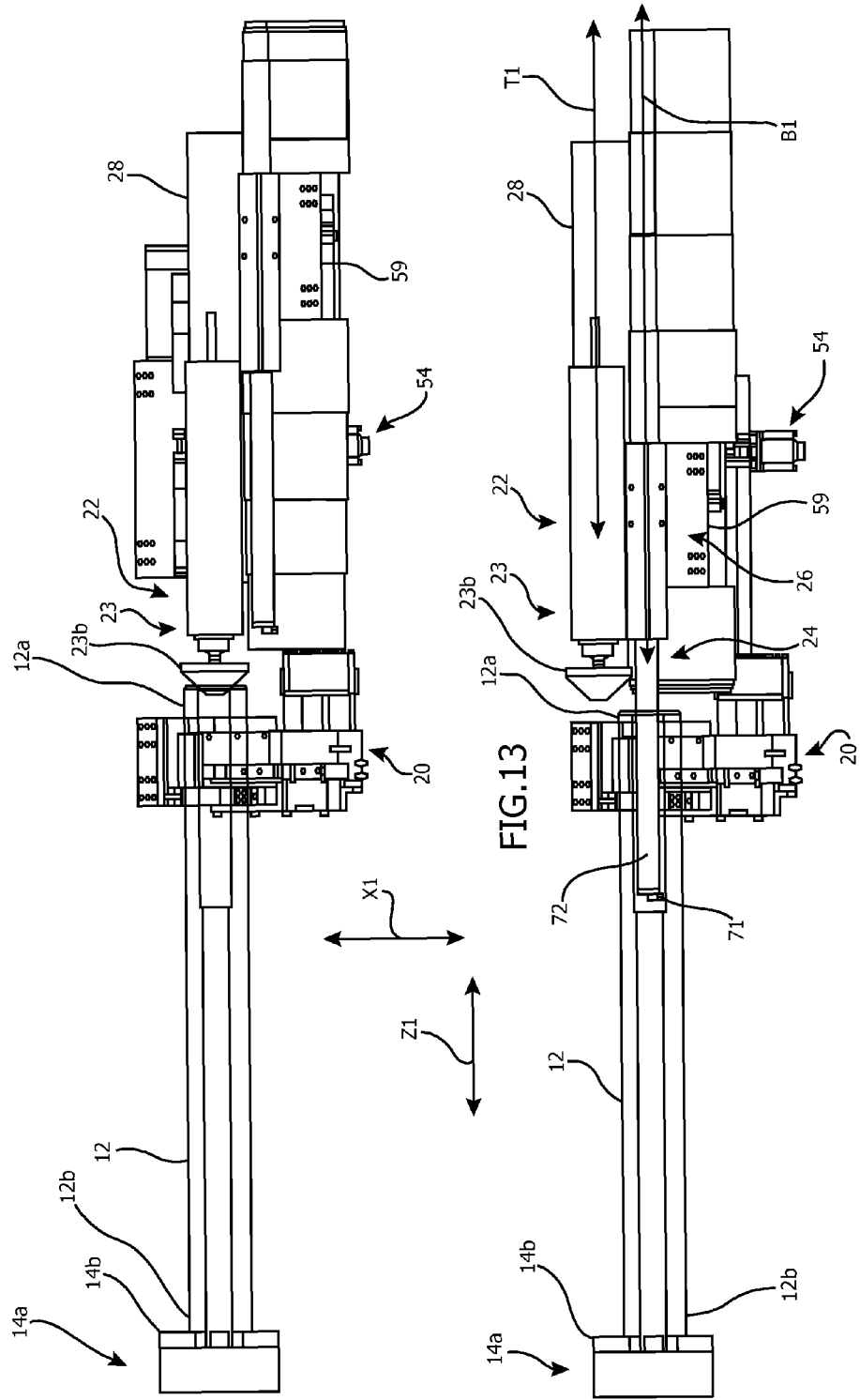

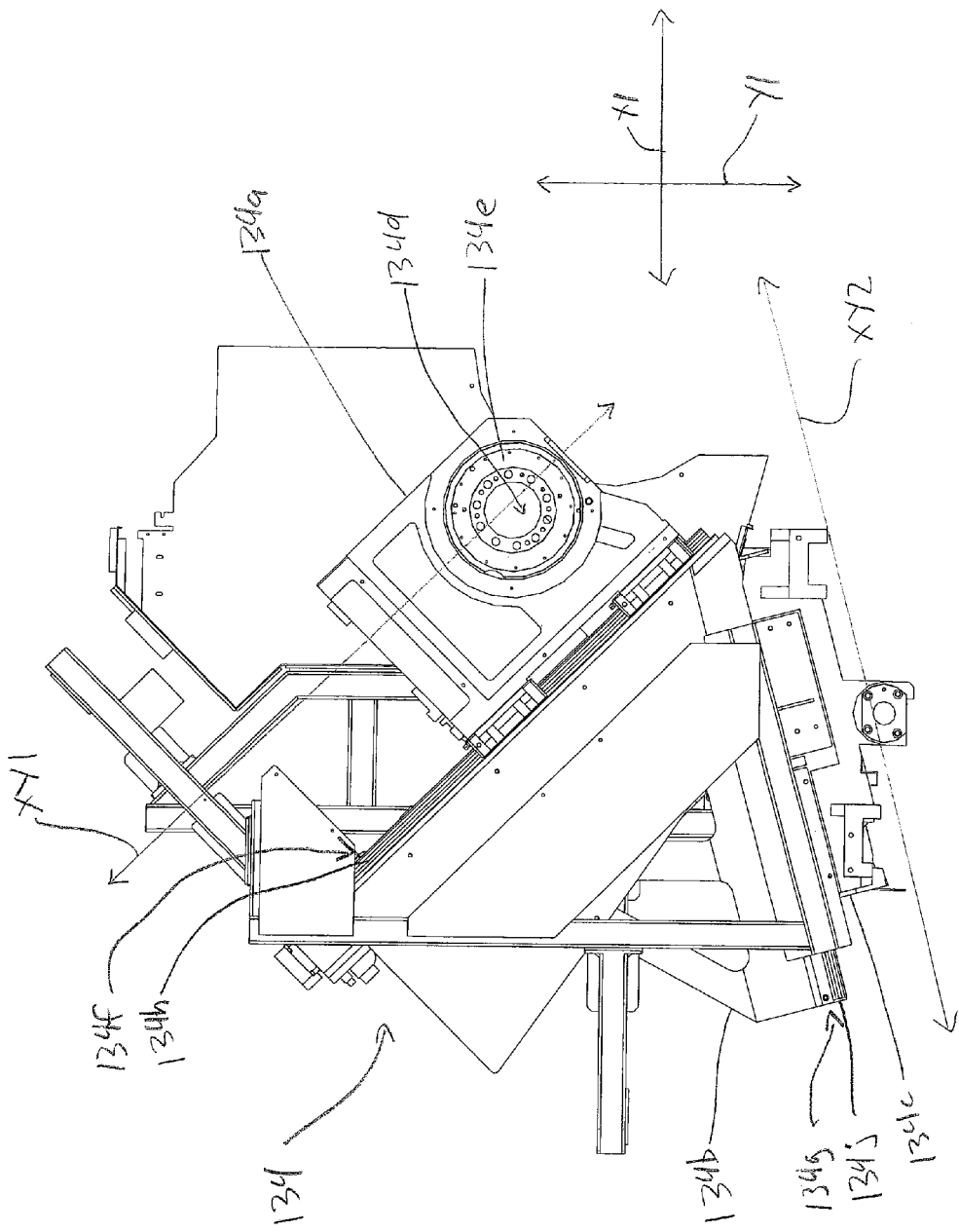

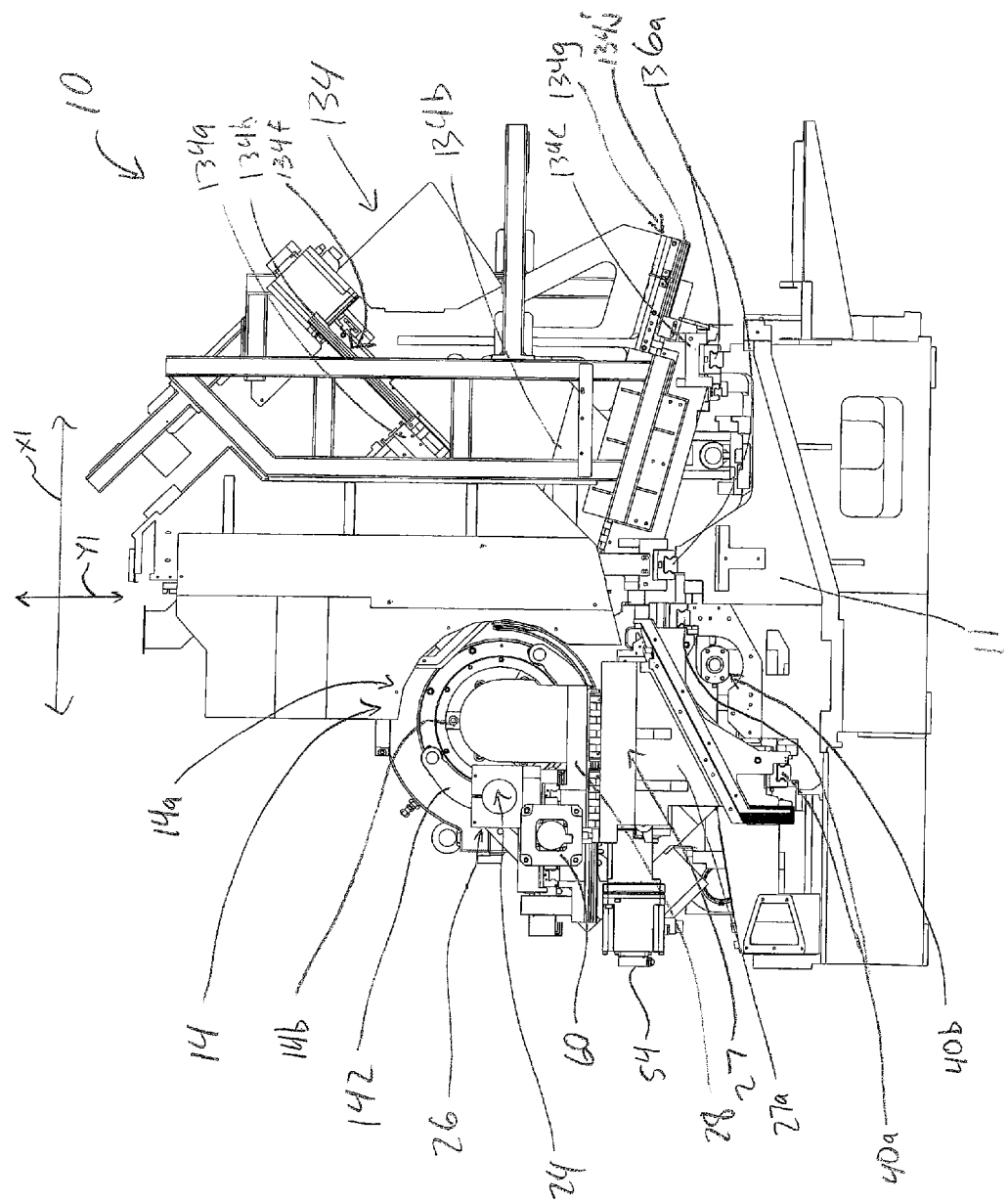

MACHINE TOOL APPARATUS AND METHOD

FIELD OF THE INVENTION

The present invention relates to a machine tool apparatus and method and, more particularly, to a machine tool for exterior and interior cutting operations on a workpiece.

BACKGROUND OF THE INVENTION

Computer Numerical Control (CNC) machine tools are generally known in the art for use in machining various workpieces for a variety of uses. CNC tools commonly comprise a tooling center that secures the workpiece to be machined, as well as providing a plurality of tools for machining various internal and/or external features of the workpiece, as desired. The CNC tooling center machines the workpiece as directed by the computer, in response to computer aided design or computer aided manufacturing instructions.

One type of CNC machine tool is a CNC turning center, such as the Mazak QTN450MY 3000U machine tool, provided by the applicants' assignee herein, Mazak Corporation. A CNC turning center generally includes a headstock, for securing one end of a workpiece and rotationally driving the workpiece, a tailstock for securing the opposite end of the workpiece, and a turret for holding multiple cutting tools that can be selected during machining to perform various machining operations on the workpiece. Some turning centers include a steady-rest that can selectively support the workpiece between the headstock and the tailstock to provide additional support to an elongated body of the workpiece during machining.

In general, the workpiece is secured at each end and turned via the headstock, which can rotate the workpiece at a predetermined speed. The tailstock can rotate in accordance with the rotation of the workpiece caused by the headstock. Likewise, the steady rest can allow the workpiece to rotate while the steady rest supports the workpiece between the headstock and the tailstock.

The turret can travel along the axis of the workpiece to machine various axial locations along the outer surface of the workpiece between the headstock and the tailstock. The turret holds multiple cutting tools that can machine the outer surface of the workpiece. Additionally, the turret may hold a boring tool that can machine the interior of the workpiece when the turret is translated beyond the end of the workpiece supported by the tailstock. In a typical CNC turning center, the turret is a generally disc shaped member mounted for rotation on a carriage. These tools extend from the perimeter of the turret for selection via rotation of the turret. However, because the boring tool is elongated, the boring tool axis will extend perpendicularly to the plane of the disc-shaped member of the turret and generally parallel to the rotary axis of the turret and the central axis of the elongate workpiece. The boring tool mounted to the turret extends toward the driven end of the workpiece held by the headstock.

A turning center having a turret allows for multiple machining operations due to the number of different tools that are attached to the turret. Based on the programming of the computer, the turning center can switch from using one external cutting tool to another, and subsequently switch from an external cutting tool to the boring tool. This tool switching allows for complex machining of a workpiece without requiring an operator to change out tools, providing for an efficient process.

The boring tool is typically an elongated cylindrical bar having a cutting tip disposed at one end. The depth that the boring tool can machine inside the workpiece is limited by the length of the boring tool. The longer the boring tool, the deeper the boring tool can bore within the workpiece.

However, having the turret carry the boring tool limits the range of machining on the workpiece. The typical turning center is generally enclosed to keep debris and machining coolant from entering the air and to shield the machinist from such debris. This allows the machinist to closely monitor the machining process, but limits the amount of space within which the tools can operate. The headstock is located at one end of the machine and includes a rotary drive for rotating the workpiece. When the boring tool is mounted at the turret, it extends toward the headstock. Because the boring tool extends toward the headstock, the turret cannot travel closer to the headstock than the length of the boring tool. In the Mazak QTN450MY 3000U machine tool, the length of the boring tool is restricted to 210 mm to allow the full length of the workpiece, and particularly portions thereof near the headstock to be machined by the external cutting tools carried by the turret. In other words, if the boring tool was longer than 201 mm, then external machining operations on portions of the workpiece adjacent the headstock would not be able to be undertaken due to the interference between the longer boring tool and the headstock. For example, if the boring tool extends 500 mm from turret, there is an axial window within which exterior machining of the elongated workpiece cannot be performed. In this example, the window is about 290 mm (500 mm-210 mm). Therefore, mounting a longer boring tool to the turret limits the axial machining range of the turret along the elongated workpiece.

For the boring tool to machine the interior of the workpiece, the turret must travel beyond the end of the workpiece engaged by the tailstock. The turret must be able to clear the end of the workpiece at least by the distance that the boring tool extends from the turret. As discussed above, in the QTN450MY 3000U machine tool, the maximum length of the boring tool is about 210 mm without restricting the length of the workpiece that can have exterior cutting operations performed thereon. The maximum length of the workpiece is about 3331 mm, minus the chucking length at the headstock and the length of the boring tool. In one form, a 21 inch diameter chuck has a chucking length of 254 mm. Thus, a 210 mm boring tool would require a reduction in the length of the workpiece to 2867 mm. Increasing the length of the boring tool to 500 mm would reduce the length of the workpiece to 2577 mm. Therefore, mounting the boring tool to the turret requires a decreased length of the workpiece between centers if boring operations are desired. The longer the boring tool, the shorter the workpiece must be to allow for the boring tool to sufficiently clear the tailstock end of the workpiece. To perform deep boring operations without sacrificing the length of the workpiece, the workpiece would need to be removed from the turning center and machined using a different machine tool dedicated to deep boring.

Moreover, the turret has a limited size in which cutting tools or boring tools can be mounted. Mounting the boring tool to the turret typically results in a decrease of the number of cutting tools that can also be mounted to the turret. Increasing the diameter of the boring tool further limits the number of other tools that can be mounted to the turret. Decreasing the number of cutting tools reduces the number of machining operations that can be performed. In the QTN450MY 3000U machine tool, the diameter of the boring tool at the turret is about 50 mm.

Additionally, the boring tool length is limited by the manner in which it is secured. As mentioned, the turret is generally disc-shaped, and thus the area of the boring tool held by the turret is generally limited to the thickness of the disc-shaped turret. As the length of the boring tool is increased, the boring tool has a greater length thereof that is cantilevered from the relatively thin disc-shaped body of the turret so that there is an increase in the instability of the boring tool due to the limited clamping area the turret provides. In the QTN450MY 3000U machine tool, the maximum diameter to length ratio of the boring tool when mounted to the turret has been found to be about 1:4.2 before the boring tool would become unstable during interior machining, resulting in chatter. Increasing the diameter of the boring tool to 100 mm, would allow for increased length of the boring tool to 420 mm, but this increased length would restrict the range of machining and the length of the workpiece, as described above, in addition to further limiting the area at the turret to mount cutting tools.

Thus, the length of the boring tool or the length of the workpiece is restricted. First, with the boring tool extending orthogonally from the face of the turret, the length of the boring tool limits the distance that the turret can translate toward the headstock, thereby limiting the axial machining range of the cutting tools held at the turret. Second, the elongate boring tool is mounted to the disc-shaped body of the turret to be cantilevered therefrom, such that the portion of the boring tool that is held by the disc-shaped body is limited to the thickness of the disc-shaped body of the turret. The limited support of the boring tool limits the length of the boring tool to avoid instability of the boring tool during machining. Third, for the boring tool to machine the interior of the workpiece, the turret needs to translate beyond the end of the workpiece at the tailstock end a distance far enough to permit the entire length of the boring tool to be beyond the end of the workpiece. Thus, for a given size of the turning center, a longer boring tool will typically require a shorter workpiece.

SUMMARY OF THE INVENTION

In accordance with the present invention, a machine tool apparatus for performing internal boring operations having a boring tool holder and an end work support mounted to a common support assembly is provided that overcomes the aforementioned problems of the prior art.

In accordance with one aspect of the invention, a machine tool apparatus is provided that has a machine base, a work holder configured to be secured to one end of a workpiece and having a rotary drive for rotationally driving the workpiece about a central axis thereof. An end work support is configured to support the workpiece at an end opposite the work holder for rotation as the workpiece is driven by the work holder. A cutting tool holder is configured for holding multiple cutting tools, and a carriage assembly is mounted to the machine base for shifting the cutting tool holder along the central axis for locating one of the cutting tools therealong and advancing the cutting tool holder toward the workpiece for machining the exterior of the workpiece. A boring tool holder is configured for holding a boring tool. A common support assembly supports the end work support and the boring tool holder to allow the length of the boring tool to be maximized for deep boring.

Advantageously, with the boring tool holder removed from the cutting tool holder to be mounted to the common support assembly with the end work support, the length of the boring tool can be increased without requiring a decrease in the length of the workpiece within the turning center. Another advantage of the separate mounting of the exterior cutting tools and the boring tool is to allow the cutting tool holder to travel closer to the work holder along the workpiece central axis independent of the length of the boring tool. When the boring tool is mounted to the cutting tool holder, the length of the boring tool limited the distance in which the cutting tool holder could travel toward the headstock.

In one form, the common support assembly is mounted for travel along the machine base in a transverse direction relative to the workpiece central axis for selectively aligning the end work support or the boring tool holder with the corresponding end of the workpiece. This allows for exterior machining of the workpiece with one of the cutting tools with the end work support engaging the corresponding workpiece end or interior machining of the workpiece with the boring tool aligned for boring the corresponding end of the workpiece with the end work support shifted away therefrom. By mounting the boring tool holder to the common support assembly with the end work holder, the boring tool is not mounted to the cutting tool holder, allowing for a longer boring tool holder that can rigidly support a longer boring tool for deeper interior machining of the elongate workpiece, such as for forming a variety of deep boring diameters in a cylindrical workpiece.

In accordance with another aspect, a machine tool apparatus has a machine base, an end work support configured for rotatably supporting a workpiece having a central axis extending horizontally at a predetermined height, and a boring tool holder sized to support a boring tool to be disposed at the same predetermined height as the workpiece central axis. A common support assembly has the end work support and the boring tool holder mounted thereon for shifting relative to the machine base to align either the end work support or the boring tool holder with the workpiece central axis.

Advantageously, the common support assembly allows for the boring tool holder or the end work support to selectively align with the end of the workpiece by shifting along a common plane without requiring the boring tool to be shifted vertically for aligning with the workpiece.

In one form, the common support assembly includes a mounting base portion to which the end work support and the boring tool holder are mounted and a common support carriage to which the mounting base portion is mounted. The mounting base portion and the common support carriage have lateral linear guide bearings therebetween oriented to extend laterally for shifting of the mounting base portion transverse to the workpiece central axis. The common support carriage and the machine base have longitudinal linear guide bearings oriented to extend longitudinally for shifting of the common support carriage along the workpiece central axis.

The combination of the mounting base that shifts laterally and the common support carriage that shifts longitudinally allows the end work support to be shifted both along the workpiece central axis and transverse to the workpiece central axis for selective alignment and engagement with the corresponding end of the workpiece. This combination also allows the boring tool holder to be shifted both along the workpiece central axis and transverse to the workpiece central axis for selective alignment with the corresponding end of the workpiece for allowing the boring tool to be advanced into engagement with the corresponding end of the workpiece. Thus, both the end work support and the boring tool holder can be shifted bi-axially along a common plane.

In one preferred form, the machine tool also has a base plate of the boring tool holder mounted to the mounting base portion having the boring tool holder mounted thereto, and longitudinal linear guide bearings between the base plate and the mounting base portion oriented to extend longitudinally for advancing and retracting the boring tool holder and boring tool toward and away from the workpiece along the central axis thereof. The base plate mounted to the mounting base portion for longitudinal travel relative to the mounting base portion allows the boring tool to be advanced toward and away from the workpiece while the end work support remains stationary.

In accordance with another aspect, a machine tool for machining an elongate workpiece has a machine base, a headstock having a rotary drive configured for holding and rotatably driving a driven end of the elongate workpiece, a tailstock having a centering mechanism configured for engaging a supported end of the elongate workpiece opposite the driven end thereof, a steady rest having a workpiece support device configured for supporting the elongate workpiece between the headstock and the tailstock as the workpiece is rotatably driven by the headstock rotary drive, and a turret configured for holding multiple cutting tools to machine an exterior surface of the elongate workpiece, a boring tool holder configured for holding a boring tool for machining an interior surface of the elongate workpiece, and a common support assembly for the tailstock and the boring tool holder. The common support assembly is mounted for shifting relative to the machine base and is configured to allow the tailstock to engage the supported end when undertaking an exterior surface machining operation or to shift the tailstock to a non-operative position spaced from the workpiece supported end for shifting the boring tool holder toward the workpiece supported end for undertaking an interior machining operation.

In one form, the common support assembly may include a common support carriage and a mounting base portion of the tailstock to which the boring tool holder is mounted, with the common support carriage and the machine base having longitudinal linear guide bearings therebetween oriented to extend longitudinally for shifting the tailstock to engage the workpiece supported end, and the mounting base portion and the common support carriage having lateral linear guide bearings therebetween oriented to extend laterally for shifting the tailstock to the non-operative position and aligning the boring tool holder with the supported end of the elongate workpiece. Mounting the boring tool holder to the mounting base portion along with the tailstock and separately from the turret allows for switching between engaging the workpiece with the tailstock or aligning the boring tool holder with the workpiece independent of the turret.

In another form, the common support assembly may include a mounting base portion for carrying the tailstock and the boring tool holder thereon, with the boring tool holder including a base plate portion and an elongated tool holding portion mounted thereto, the base plate portion and the mounting base portion having longitudinal linear guide bearings therebetween oriented to extend longitudinally for shifting the boring tool holder relative to the tailstock toward the workpiece supported end for undertaking the interior machining operation with the tailstock shifted to the non-operative position. Mounting the base plate and the boring tool holder to the mounting base portion allows the boring tool holder to translate toward the workpiece for machining the workpiece with the boring tool independent of the tailstock without requiring the tailstock to retract behind the boring tool holder. Another advantage is that the boring tool holder can be longer and therefore rigidly support a longer boring tool to perform deeper interior machining operations on the workpiece.

In accordance with another aspect, a method for machining a workpiece includes holding a first end of a workpiece in a work holder, supporting a second end of the workpiece via an end work support, advancing a cutting tool holder carrying a cutting tool from an inoperative position toward the workpiece to an operative position to machine the exterior of the workpiece with the cutting tool, retracting the cutting tool holder from the workpiece to a stored position, disengaging the end work support from the second end of the workpiece, and advancing a boring tool holder from a stored position toward the second end of the workpiece to an operative position to machine an interior surface of the workpiece while the cutting tool holder remains in the inoperative position. Machining the interior surface while the cutting tool holder remains in the inoperative position allows for boring the workpiece independent of the cutting tool holder, and does not require the cutting tool holder to translate beyond the end of the workpiece for being aligned therewith for interior machining.

In one form, the end work support may be disengaged by translating the end work support in a direction transverse to the central axis of the workpiece. In another form, the method may include shifting the end work support and the boring tool holder together when disengaging the end work support from the second end of the workpiece. In yet another form, the method may include shifting the end work support in a direction transverse to the central axis of the workpiece to a non-operative position, and keeping the end work support fixed in the non-operative position laterally adjacent to the boring tool holder while the boring tool holder is advanced toward the second end of the workpiece to machine the interior surface of the workpiece. By advancing the boring tool holder while the end work support is shifted transverse to the workpiece central axis to a non-operative position, a longer boring tool can be used for deeper interior machining because the boring tool is essentially swapped out for the end work support to take up the space formerly occupied by the end work support in its operative position engaged with the workpiece. However, the end work support is not retracted away from the workpiece along the workpiece axis to create space for the boring tool, which avoids the compromise between shorter or longer workpieces or boring tools. This is in contrast to the prior machine which retracted the end work support along the workpiece axis to its non-operative position requiring the turret to be oriented to position the boring tool between the workpiece and the end work support in line with the workpiece central axis for a boring operation. As is apparent, in this instance either the boring tool or the workpiece length had to be compromised to fit in a given size housing for the machine tool.

In one form, the cutting tool holder may be advanced toward the workpiece to machine the exterior of the workpiece with the cutting tool holder between the driven end and the supported end of the workpiece while the boring tool holder is located at the opposite side of the supported end. With the boring tool holder located beyond the end of the workpiece and separate from the cutting tool holder, the cutting tool holder can machine a greater length along the workpiece further toward the work holder.

BRIEF DESCRIPTION OF THE DRAWINGS

FIG. 9 is a right side elevational view of the common support assembly of FIG. 5;

FIG. 10 is a bottom perspective view of the common support assembly of FIG. 5, with the common support carriage removed to illustrate the bottom of the mounting base portion and a screw drive mechanism for translating the mounting base assembly laterally along the X-axis X1 relative to the common support carriage;

FIG. 11 is a bottom perspective view of the boring tool holder of FIG. 5, with the mounting base portion removed to illustrate the bottom of the base plate and a screw drive mechanism for translating the base plate longitudinally along the Z-axis Z1 relative to the mounting base portion;

FIG. 12 is a top plan view of a workpiece held at one end by the headstock and supported at the opposite end by the tailstock, with the steady rest providing support therebetween, and illustrating an operative position of the tailstock;

FIG. 13 is a top plan view of the workpiece of FIG. 12, with the tailstock disengaged from the workpiece illustrating a non-operative position of the tailstock, with the boring tool aligned with the corresponding end of the workpiece and translated into the workpiece;

FIG. 14 is a left side elevational view of the carriage assembly of FIG. 2, with the turret removed to illustrate the carriage assembly;

FIG. 15 is a right side elevational view of the machine tool of FIG. 1, with the housing removed to illustrate the alignment of the tailstock with the headstock, with the boring tool mounted adjacent the tailstock.

DETAILED DESCRIPTION OF THE PREFERRED EMBODIMENTS

Figure 1:
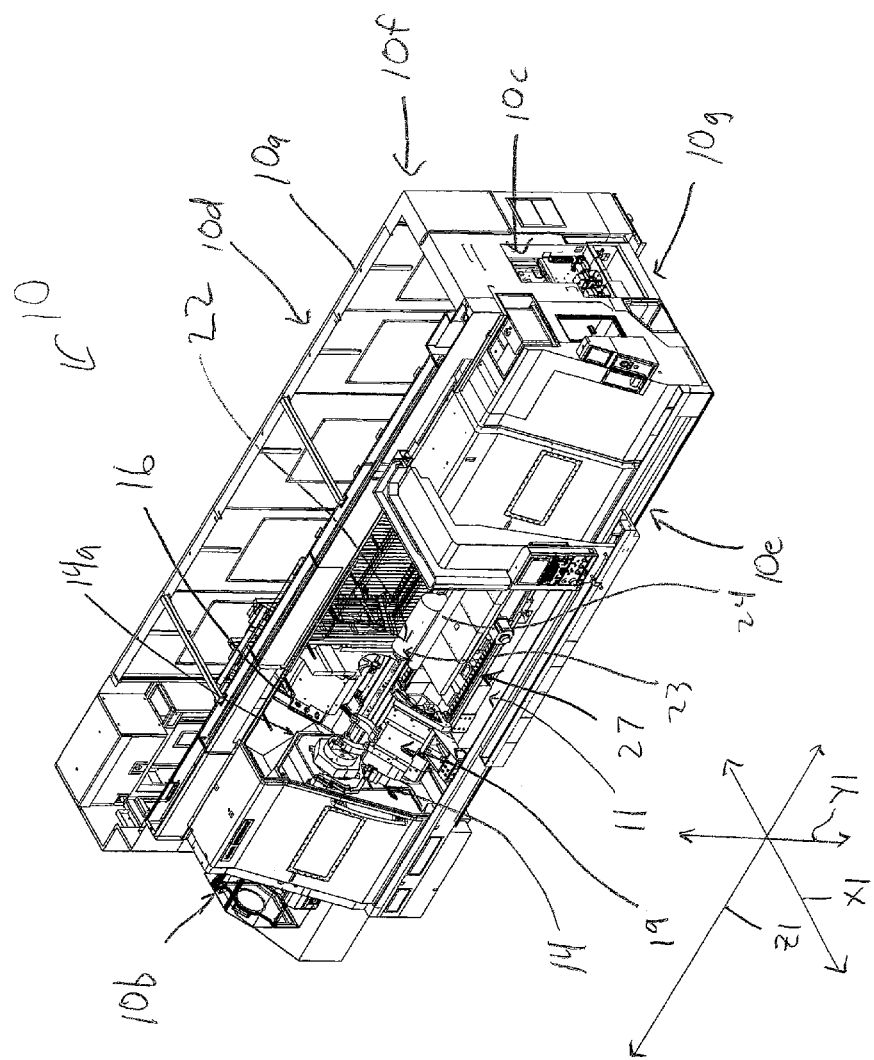
FIG. 1 is a perspective view of a machine tool for rotating a workpiece illustrating a housing within which are mounted: a machine base, a headstock, a steady rest, a turret mounted to a carriage assembly, and a common support assembly having a tailstock and a boring tool mounted thereto.

As shown, a turning center 10 is provided for machining a workpiece 12, such as a cylindrical bar or other elongated member. With reference to FIGS. 1-4, the turning center 10 generally includes a base 11, a work holder 14 in the form of the illustrated headstock 14a having a rotary drive 14c and chucking members 14b mounted thereto that are rotatably driven to rotate the workpiece 12, a cutting tool holder 16 in the form of the illustrated turret 16a holding multiple cutting tools 18 for machining the exterior of the workpiece 12, an intermediate work support 19 in the form of the illustrated steady rest 20 for engaging the exterior of the workpiece 12 and providing it support, an end work support 22 in the form of the illustrated tailstock 23 for engaging and supporting the end of the workpiece 12 opposite the work holder 14, a boring tool 24 for machining the interior of the workpiece 12, a boring tool holder 26 for holding the boring tool 24, and a common support assembly 27 having a common support carriage 27a and a mounting base portion 28 mounted thereto for mounting the end work support 22 and the boring tool holder 26.

The mounting base portion 28 mounts the boring tool 24 adjacent the end work support 22 rather than at the cutting tool holder 16. Mounting the boring tool 24 to the mounting base portion 28 of the common support assembly 27 allows the turret 16a to travel close to the headstock 14, because the boring tool 24 does not extend orthogonally from the turret 16a. Furthermore, mounting the boring tool 24 at the mounting base portion 28 allows for a longer boring tool 24 that can bore deeper into the workpiece 12 without sacrificing the length of the workpiece 12 to be machined within housing 10a of the turning center 10. In one approach, the length of the boring tool 24 is about 1145 mm, which is supported by the boring tool holder 26 along a length of 507 mm. The diameter of the boring tool 24 is about 100 mm. In this approach, the length of the workpiece 12 within the housing 10a of the turning center 10 is about 3578 mm, minus the clamping distance at the chucking members 14b. In one approach, the clamping distance at the chucking members 14b is about 234 mm, reducing the machinable length of the workpiece 12 to 3344 mm.

Figure 2:
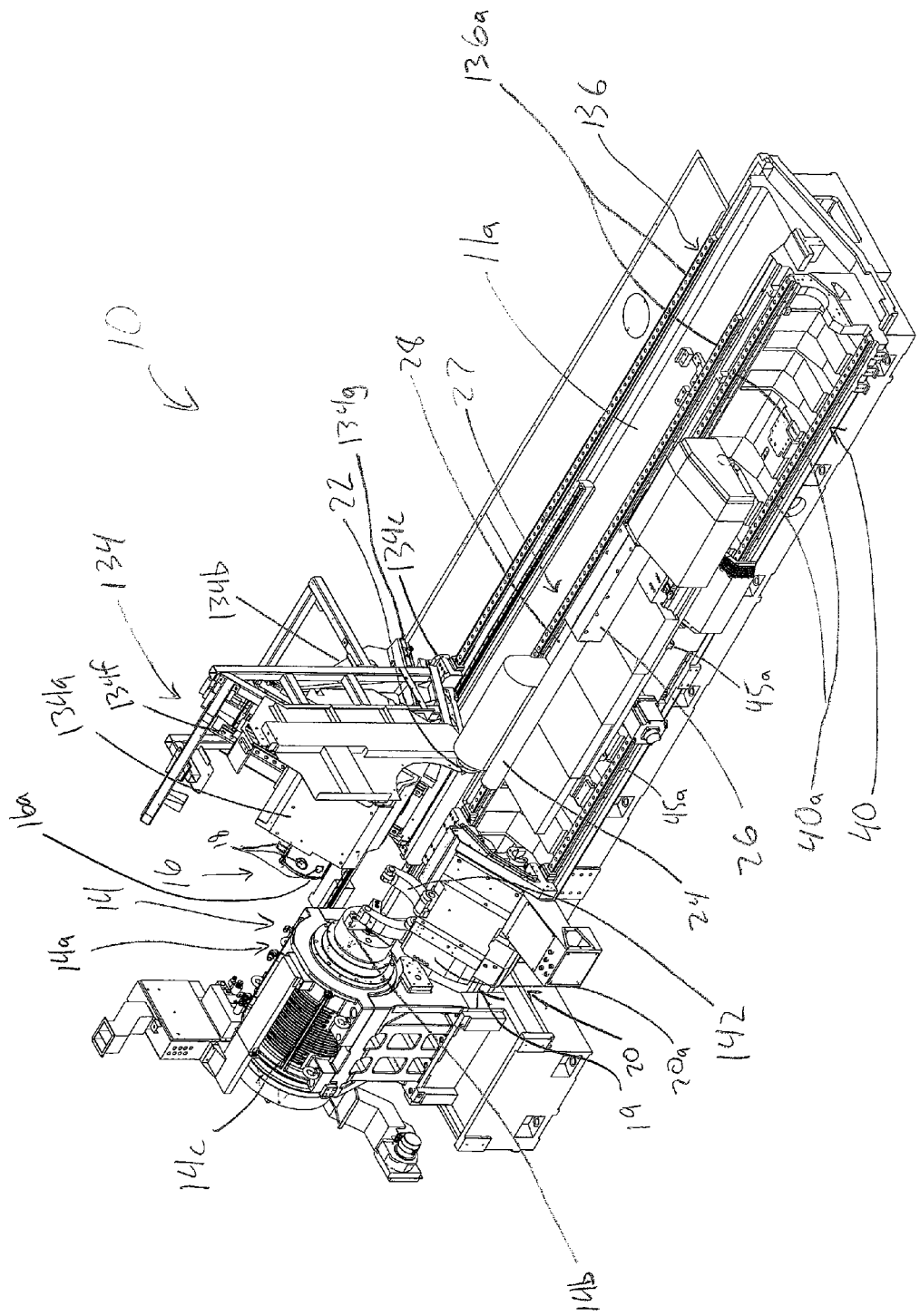
FIG. 2 is a perspective view of the machine tool of FIG. 1 having the housing removed to illustrate the arrangement of the machine base, headstock, the turret, the steady rest, the common support base, the tailstock, and a boring tool holder having the boring tool.
Figure 3:
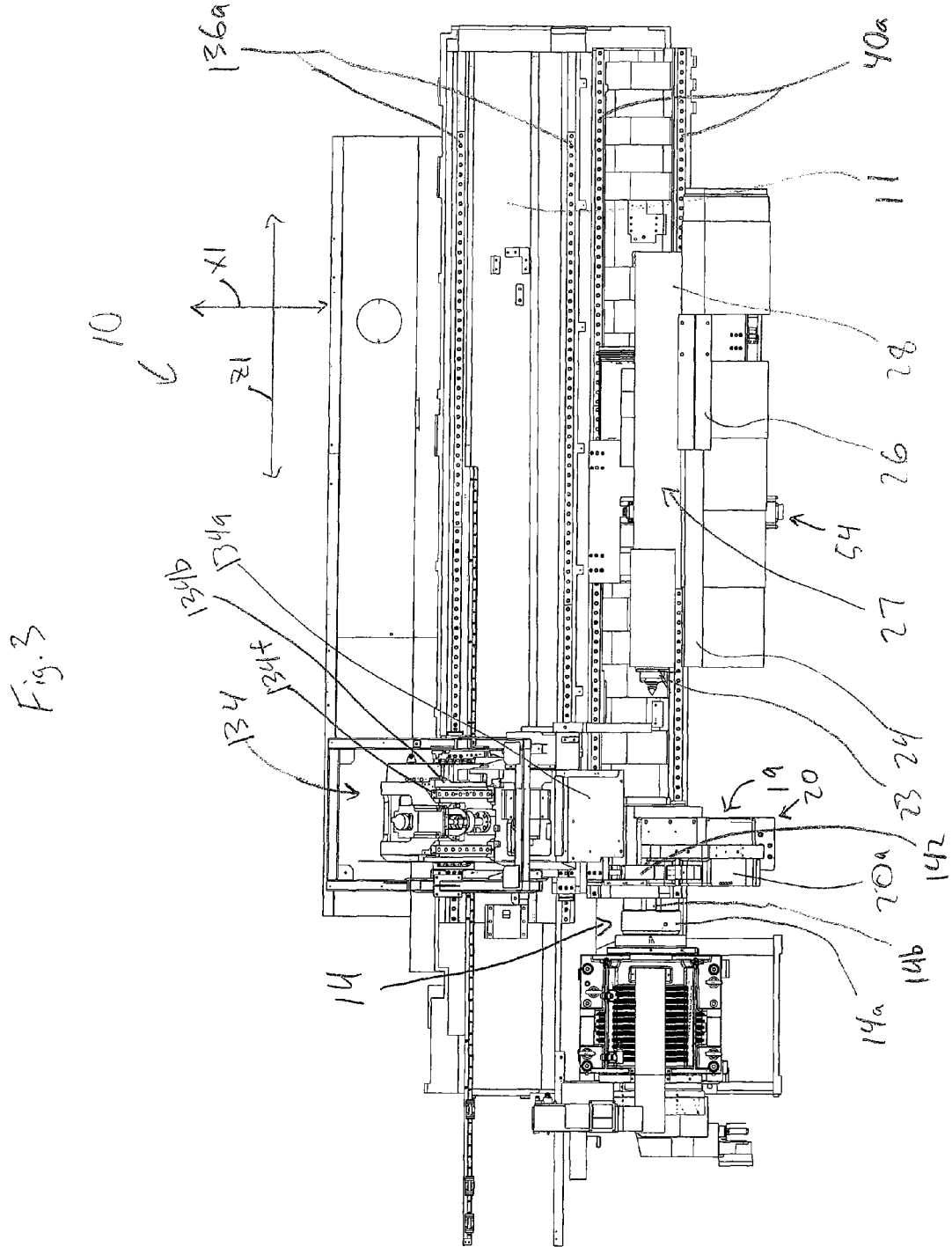
FIG. 3 is top plan view of the machine tool of FIG. 1 having the housing removed to illustrate the arrangement of the machine base, headstock, the turret, the steady rest, the common support base, the tailstock, and the boring tool holder having the boring tool.
Figure 4:
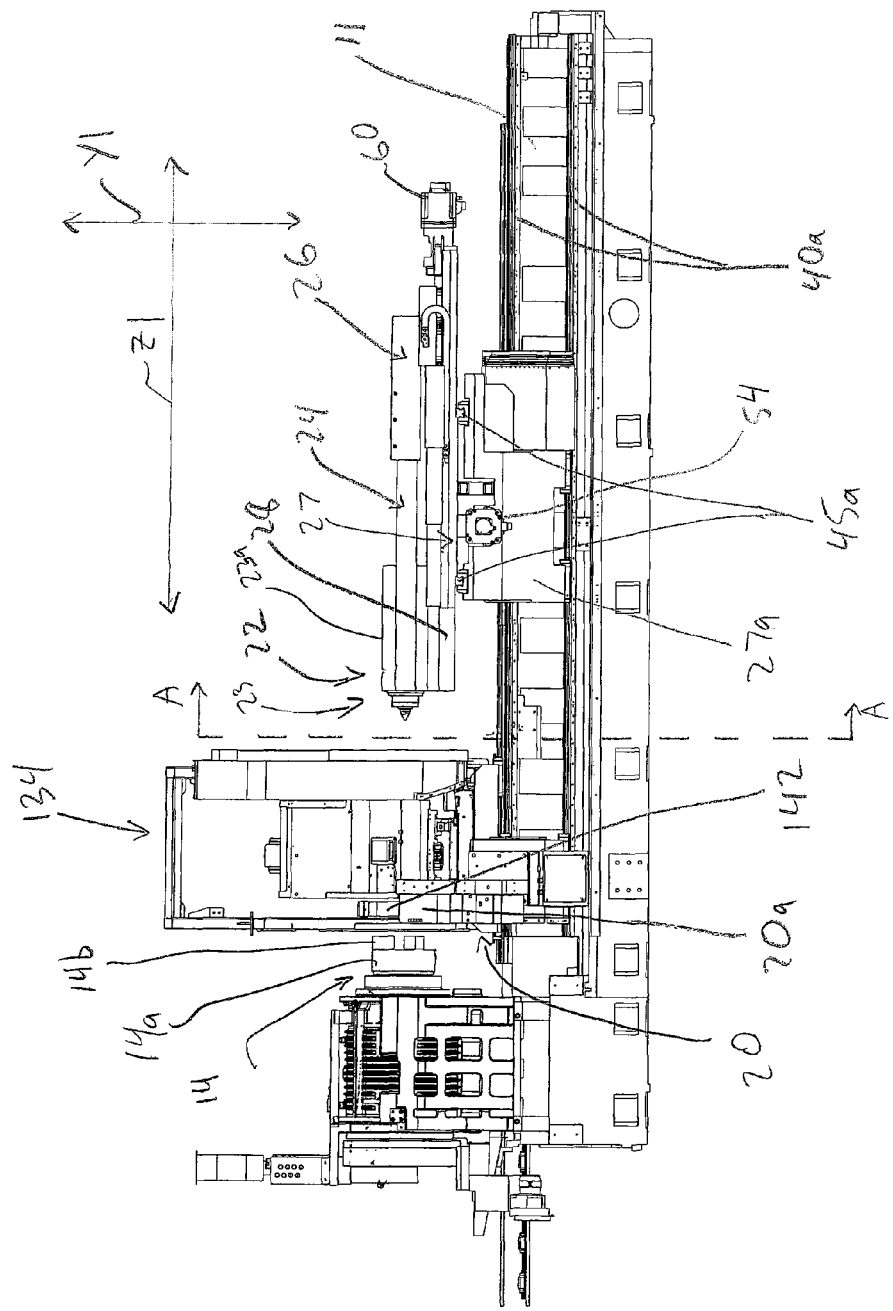
FIG. 4 is front elevational view of the machine tool of FIG. 1 having the housing removed to illustrate the arrangement of the machine base, headstock, the turret, the steady rest, the common support base, the tailstock, and the boring tool holder having the boring tool.
Figure 5:
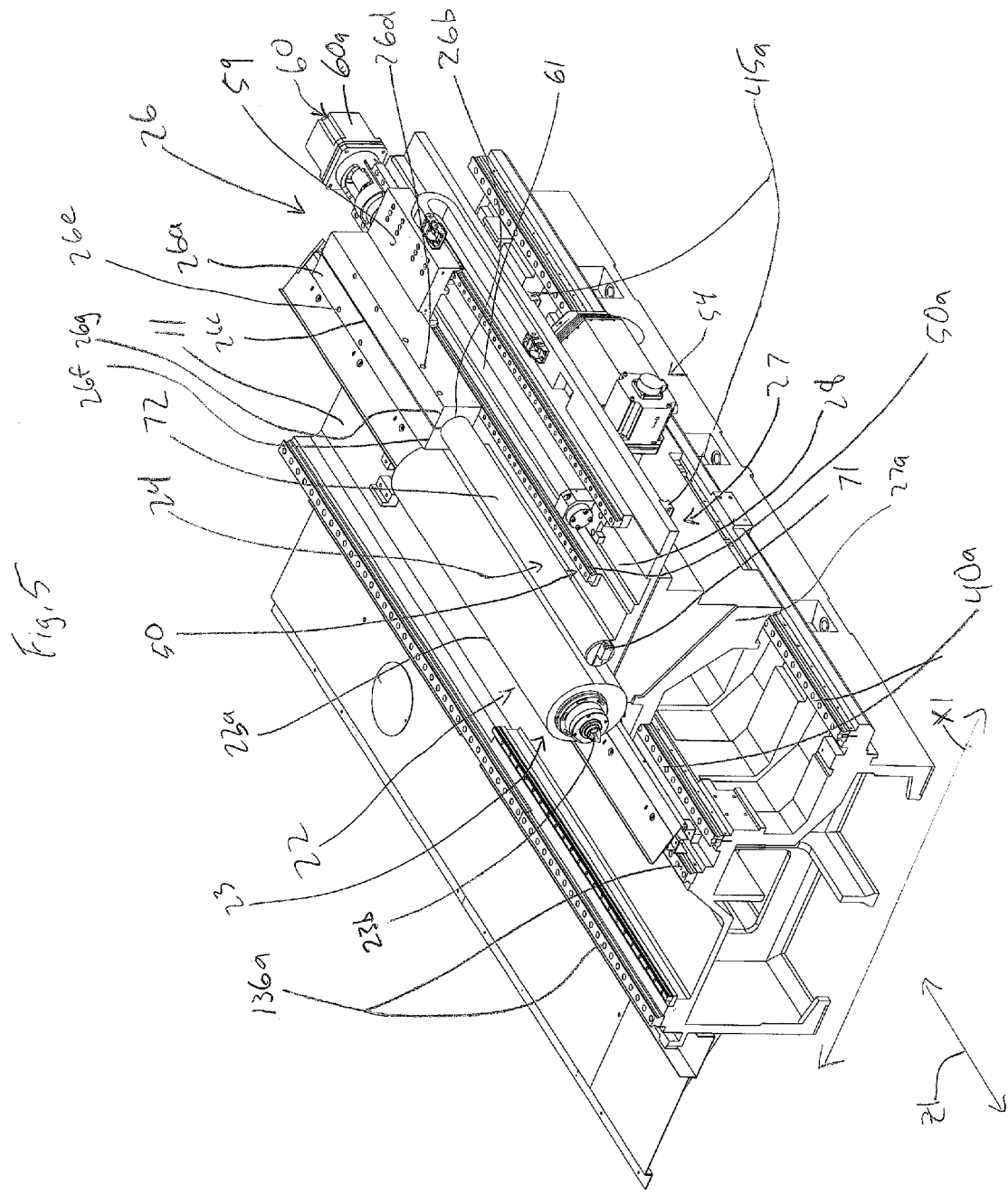
FIG. 5 is a perspective view of a section of the machine tool of FIG. 1 taken along the line A-A illustrating the common support assembly having a common support carriage and a mounting base portion, the machine base, the tailstock, and the boring tool holder having a base plate and the boring tool.
Figure 6:
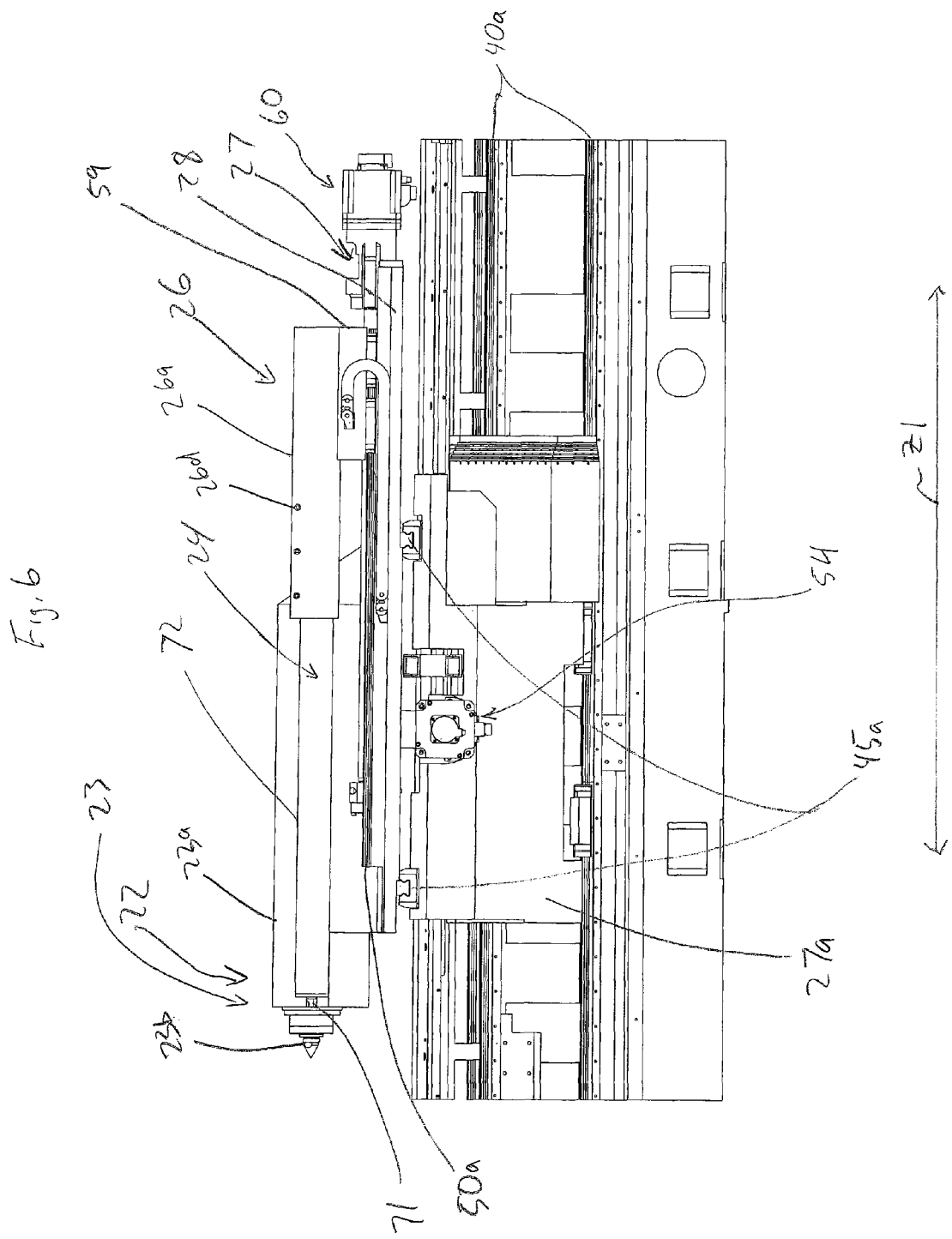
FIG. 6 is a front elevation view of the common support assembly of FIG. 5.
Figure 7:
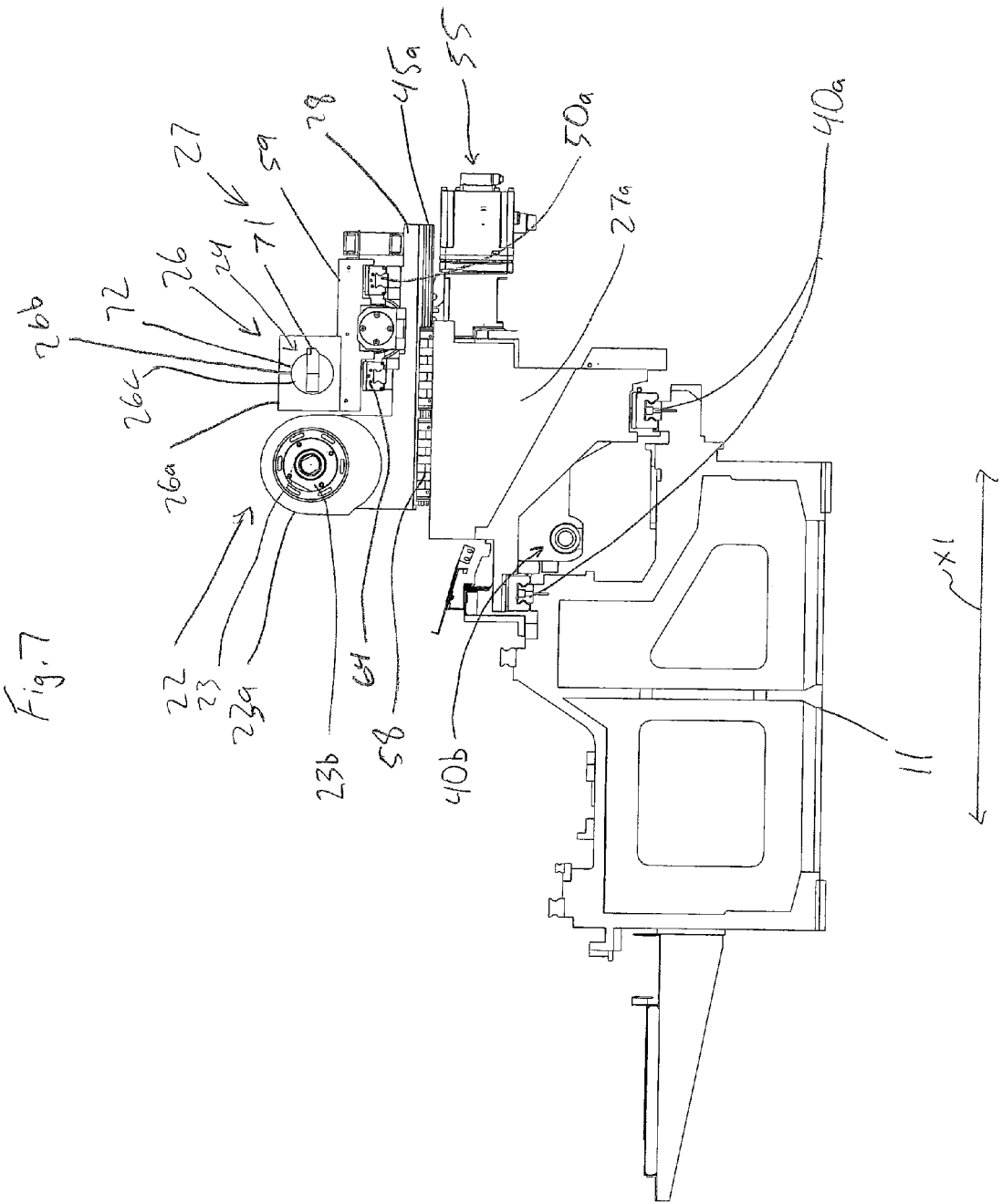
FIG. 7 is a left side elevational view of the common support assembly of FIG. 5.
Figure 8:
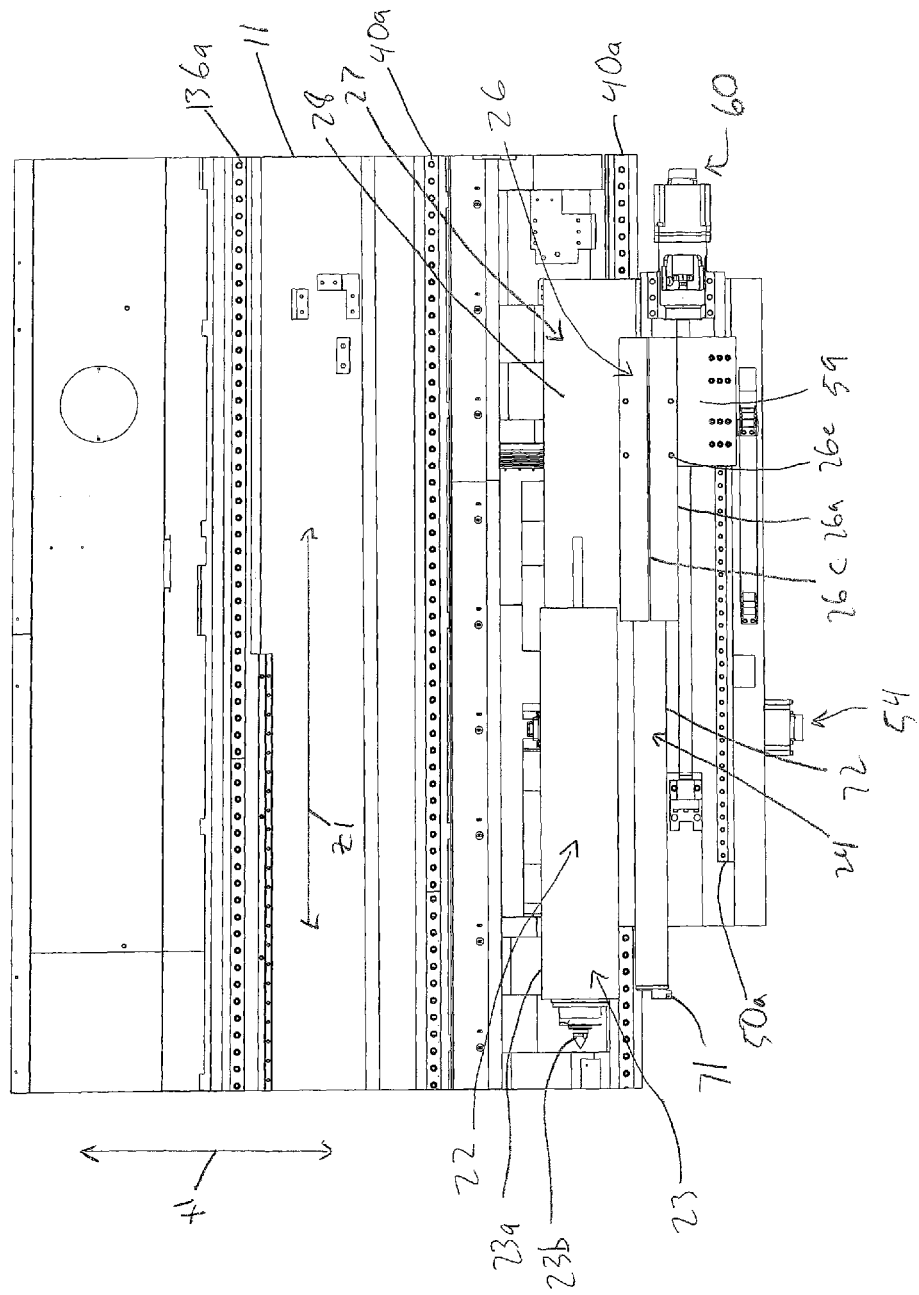
FIG. 8 is a top plan view of the common support assembly of FIG. 5.

With reference to FIGS. 1 and 2, the turning center 10 has a housing 10a that is generally enclosed to keep debris and other airborne matter resulting from the machining process from exiting the turning center 10 during machining. The turning center 10 includes a left end 10b, a right end 10c, a rear side 10d, a front side 10e, a top 10f, and a bottom 10g. A longitudinal Z-axis Z1 runs from the left end 10b to the right end 10c. A lateral X-axis X1 runs from the front side 10e to the rear side 10d. A generally vertical Y-axis Y1 runs from the bottom 10f to the top 10g.

The base 11 is mounted within the housing 10a and generally includes a machine bed 11a that extends along the longitudinal Z-axis Z1. The headstock 14a is located adjacent the left end 10b of the turning center 10. The headstock 14a includes multiple chucking members 14b for holding the workpiece 12. In one approach, the chucking members 14b hold the workpiece 12 having a diameter of 21 inches; however, the chucking members 14b can also hold workpieces 12 having other diameters, such as, for example, 15 inches or 18 inches. As is known, the headstock 14a includes the rotary drive 14b that rotatably drives the workpiece 12 held by the chucking members 14b about a central axis of rotation that is generally parallel to the longitudinal Z-axis Z1. In one approach, the headstock 14a drives the workpiece 12 at 2,000 RPM and 40 horsepower. The headstock 14a is typically servo-controlled and receives feedback on the rotational speed to allow for precise rotation and machining of the workpiece 12.

With reference to FIGS. 2 and 5-9, the common support assembly 27 is located adjacent the right end 10c of the turning center 10 opposite the headstock 14a. The common support carriage 27a is mounted to the base 11 with front linear guide bearings 40 therebetween extending longitudinally along the Z-axis Z1 for permitting the common support carriage 27a to travel along the Z-axis Z1. The illustrated front linear guide bearings 40 are in the form of a track or a pair of rails 40a mounted to the base 11, though slides, ways, or other linear guide bearings can also be used. The common support carriage 27a is translated along the rails 40a via a drive-screw mechanism 40b.

The mounting base portion 28 is mounted to the common support carriage 27a with lateral linear guide bearings 45 therebetween extending laterally along the X-axis X1 for permitting the mounting base portion 28 to travel relative to the common support carriage 27a and transverse to the central axis of the workpiece 12. The illustrated lateral linear guide bearings 45 are in the form of a track or a pair of rails 45a mounted to the mounting base portion 28, but can also be in the form of a slide, way, or other linear guide bearing.

The tailstock 23 and the boring tool holder 26 are mounted to the mounting base portion 28 laterally adjacent each other for selective alignment with the corresponding end of the workpiece 12 via the transverse translation of the mounting base portion 28 relative to the common support carriage 27a. In one form, the tailstock 23 and the boring tool holder 26 have respective longitudinal central axes T1 and B1 having a fixed distance therebetween. Furthermore, the axes T1 and B1 are located generally at the same vertical height as the central axis of the workpiece 12 relative to the Y-axis Y1. Therefore, the mounting base portion 28, and the tailstock 23 and boring bar holder 26 mounted thereto, can be positioned bi-axially along the Z-axis Z1 and the X-axis X1 relative to the corresponding end of the workpiece 12 without requiring vertical translation along the Y-axis Y1. The common support assembly 27 can translate longitudinally toward and away from the corresponding end of the workpiece 12 via the travel of the common support carriage 27a along the Z-axis Z1, and also transverse to the central axis of the workpiece 12 along the X-axis X1 via the rails 45a. The location of the common support carriage 27a and the mounting base portion 28 are servo controlled to allow for precision controlled movements along both the Z-axis Z1 and the X1-axis X1, respectively.

More specifically, and with reference to FIG. 10, the mounting base portion 28 is motor-driven for translation relative to the common support carriage 27a via a screw drive mechanism 54. The mounting base portion 28 has a flange 28a extending from the bottom surface thereof. The flange 28a has a threaded sleeve 28b fixedly mounted thereto. The screw drive mechanism 54 has a servo-driven motor 55 with a threaded rotary shaft 56 mounted thereto and rotatably driven by the motor 55. The threaded rotary shaft 56 is further rotatably mounted to a support housing 57 at the opposite end of the threaded rotary shaft 56. The servo-driven motor 55 and the support housing 57 are fixedly mounted to the common support carriage 27a. The threaded rotary shaft 56 is received within the threaded sleeve 28b.

Additionally, the rails 45a are fixedly mounted to the lower surface of the mounting base portion 28 such that the rails 45a travel within a set of trucks 58, which are fixedly mounted to the common support carriage 27a. Thus, the motor 55, the support housing 57, the trucks 58, and the threaded rotary shaft 56 are mounted to the common support carriage 27a and do not translate laterally relative to the common support carriage 27a. To translate the mounting base portion 28, the motor 55 rotatably drives the threaded rotary shaft 56, which converts the rotational movement of the threaded rotary shaft 56 into translational movement of the mounting base portion 28. To drive the mounting base portion 28 for translation in the opposite direction, the motor 55 rotates the threaded rotary shaft 56 in the opposite rotary direction.

As shown in FIGS. 5-9, the boring tool 24 is mounted to the boring tool holder 26, which is mounted to an underlying base plate 59, which is mounted on the mounting base portion 28. The boring tool holder 26 has a generally rectangular body 26a, having a generally cylindrical cavity 26b therein. The boring tool holder 26 further has an upper slot 26c and a plurality of through-holes 26d. The boring tool holder 26 further has a plurality of mounting holes 26e for mounting the boring tool holder 26 to the base plate 59 via fasteners. The boring tool holder 26 clamps and holds the boring tool 24 in place by receiving the boring tool 24 in the cylindrical cavity 26b and clamping the boring tool holder 26 together via fasteners inserted through the through-holes 26d to draw opposite upper clamping portions 26e and 26f of the body 26a toward each other and tightly against the boring tool 24. In one approach, the length of the cavity 26b that clamps and supports the boring tool 24 is about 507 mm, and the diameter of the boring tool 24 is about 100 mm. By way of example, the length of the boring tool 24 that extends from the boring tool holder 26 can be approximately 1145 mm.

The base plate 59 is mounted to the mounting base portion 28 with base plate linear guide bearings 50 therebetween, which extend generally along the Z-axis Z1. The illustrated base plate linear guide bearings 50 are in the form of a track or a pair of rails 50a mounted to the mounting base portion 28, but can also be in the form of a slide, way, or other linear guide bearing. The base plate 59 can translate longitudinally toward and away from the corresponding end of the workpiece 12 along the Z-axis Z1 relative to the mounting base portion 28 and the tailstock 23 mounted thereto.

More specifically, and with reference to FIG. 11, the base plate 59 is motor-driven for translation via a base plate screw drive mechanism 60. The base plate 59 includes a flange 59a extending from the bottom of the base plate 59. The flange 59a has a threaded sleeve 59b mounted thereto. The base plate screw drive mechanism 60 includes a servo driven motor 60a having a threaded rotary shaft 61 mounted thereto for being rotatably driven. The threaded rotary shaft 61 is mounted at the end opposite the motor 60a to a support housing 62. The motor 60a and the support housing 62 are fixedly mounted to the top of the mounting base portion 28. The threaded rotary shaft 61 can rotate within the support housing 62 in response to being rotatably driven by the motor 60a. The base plate 59 has a set of trucks 64 fixedly mounted thereto for travel along the rails 50a. To translate the base plate 59, the motor 60a rotatably drives the threaded rotary shaft 61 that, in combination with the flange 59a and threaded sleeve 59b, converts the rotational movement of the threaded rotary shaft 61 into translational movement along the Z-axis Z1 of the base plate 59 and the trucks 64 via the rails 50a. To drive the base plate 59 for translation in the opposite rotary direction, the motor 60a rotates the threaded rotary shaft 61 in the opposite rotary direction.

Thus, the boring tool 24 can travel along the Z-axis Z1 via the travel of the base plate 59 along the mounting base portion 28 to advance the boring tool 24 toward the corresponding end of the workpiece 12 to machine the interior thereof and to retract the boring tool 24 away therefrom, and can further travel transverse to the workpiece 12 via the travel of the mounting base portion 28 along the X-axis X1 relative to the common support carriage 27a. For example, the boring tool 24 can bore the interior of the workpiece 12 to create a 6 inch diameter cylindrical cavity having a depth of 3 feet, retract from that depth, and then subsequently bore the interior of the workpiece 12 to create a 9 inch diameter cylindrical cavity having a depth of 2 feet. The location of the boring tool 24 along the Z-axis Z1 relative to the mounting base portion 28 is generally servo-controlled via the motor 60a that receives feedback for precisely locating the boring tool 24 along the Z-axis Z1.

In one form, the boring tool holder 26 only shifts along the Z-axis Z1 such that it does not overlap the length of the workpiece 12 along the central axis of the workpiece 12. Unlike the prior art where the boring tool 24 is mounted at the turret 16a, the boring tool 24 mounted to the mounting base portion 28 does not take up space along the Z-axis Z1 between the headstock 14a and the tailstock 23 when the boring tool 24 is not machining the workpiece 12.

As shown in FIGS. 5-8, the boring tool 24 includes a cutting tip 71 and a generally elongated body 72. The cutting tip 71 is mounted at the forward end of the body 72 nearest the workpiece 12. The body 72 has a generally elongated cylindrical shape and is mounted within the boring tool holder 26 as described above. The cutting tip 71 is oriented generally along the X-axis X1 beyond the circumference of the body 72. Thus, when the boring tool 24 is machining the interior of the workpiece 12, the cutting tip 71 will engage and cut an interior surface of the workpiece 12 while the body 72 remains clear of the cut interior surface. By way of example, the diameter of the body 72 can be approximately 100 mm.

With reference to FIGS. 2-10, the tailstock 23 provides support to the workpiece 12 by engaging the end of the workpiece 12 opposite the headstock 14a. The tailstock 23 generally includes a housing 23a, which is preferably formed as a single piece with the mounting base portion 28. However, the housing 23a could, alternatively, be a separate unit mounted to the mounting base portion 28. The tailstock 23 includes a rotatable shaft mounted within bearings, rollers or other known rotary bearings within the housing 23a to allow the tailstock 23 to rotate about a central axis thereof in response to the workpiece 12 being rotatably driven by the headstock 14a.

With particular reference to FIGS. 5-8, the tailstock 23 includes a workpiece engaging or centering member 23b having various sizing depending on the size of the workpiece 12. The centering member 23b is mounted to the shaft of the tailstock 23 for rotation. Thus, when the tailstock 23 is aligned with the central axis of the workpiece 12, the tailstock 23 can travel longitudinally toward the workpiece 12 at its supported end 12a into engagement therewith via the travel of the common support assembly 27 along the Z-axis Z1. As the workpiece 12 is rotatably driven at its driven end 12b via the headstock 14a, the tailstock 23 allows the workpiece 12 to rotate while being supported at its supported end 12a. The location of the tailstock 23 via the common support assembly 27 is generally servo-controlled to receive feedback for allowing precise support and engagement with the corresponding end of the workpiece 12.

The tailstock 23 has three main positions: a retracted position; an operative position; and a non-operative boring position. In the retracted position, the common support carriage 27a is shifted away from the workpiece 12 along the Z-axis Z1 toward the right side 10c of the turning center 10 so that the tailstock 23 is disengaged from the workpiece 12. In the operative position (FIG. 12), the mounting base portion is located along the X-axis X1 such that the tailstock 23 is aligned with the central axis of the workpiece 12, and the common support carriage 27a is located such that the tailstock 23 and specifically the centering member 23b thereof engages and supports the workpiece 12. In the non-operative boring position (FIG. 13), the mounting base portion 28 is located along the X-axis X1 such that the tailstock 23 is rearwardly offset from the central axis of the workpiece 12 and the boring bar 24 is aligned with the end of the workpiece 12.

With reference to FIGS. 1, 2, and 14, the turret 16a is mounted to a carriage assembly 134. The carriage assembly 134 is mounted to rear linear guide bearings 136 that extend longitudinally along the Z-axis Z1 of the base 11. The illustrated rear linear guide bearings 136 are in the form of a track or a pair of rails 136a mounted to the base 11, but can also be in the form of slides, ways, or other linear guide bearing. The rails 136a allow the carriage assembly 134 holding the turret 16a to travel along the base 11 to position the turret 16a for machining at various axial locations along the workpiece 12. The location of the carriage assembly 134 is generally servo-controlled and receives feedback regarding its position to allow for precise machining of the workpiece 12. The carriage assembly 134 is driven along rails 136a via a linear drive mechanism such as a screw drive mechanism, though other means of driving the carriage assembly 134 for translation along its axis of movement may also be used.

With reference to FIGS. 14 and 15, the carriage assembly 134 has three slide members or components that can slide in different axial directions to position the turret 16a for machining: a turret mounting portion 134a, a wedge portion 134b, and a longitudinal slide portion 134c. The turret 16a is rotatably mounted to the turret mounting portion 134a and can be rotated to position one of the multiple cutting tools 18 for machining the workpiece 12. The turret mounting portion 134a includes a cylindrical cavity 134d configured to receive a portion of the turret 16a therein. Within the cavity 134d is a mounting plate 134e, to which the turret 16a is secured. The mounting plate 134e is servo-controlled to rotate the turret 16a to select the cutting tool 18 for machining the exterior of the workpiece 12. The turret mounting portion 134a is mounted for sliding relative to the wedge portion 134b with upper oblique linear guide bearings 134f therebetween. The upper oblique linear guide bearings 134f are in the form of a track or a pair of rails 134h mounted to the wedge portion 134b, but can also be in the form of a slide, way, or other linear guide bearing. The rails 134h extend generally along an XY1-axis XY1 that extends at an oblique angle between the X-axis X1 and the Y-axis Y1 and running between the top rear and the front bottom of the turning center 10.

The wedge portion 134b has a general wedge shaped cross-section and is mounted between the upper turret mounting portion 134a and the lower longitudinal slide portion 134c, with lower oblique linear guide bearings 134g mounted therebetween. The lower oblique linear guide bearings 134g are in the form of a track or a pair of rails 134j mounted to the wedge portion 134b, but may also be in the form of a slide, way, or other linear guide bearing. The rails 134j extend generally along an XY2-axis XY2 that extends at an oblique angle between the X-axis X1 and the Y-axis Y1 and running between the top front and the rear bottom of the turning center 10.

The longitudinal slide portion 134c is mounted to the rails 136a for translating the carriage assembly 134 having the turret 16a to various axial locations along the Z-axis Z1.

The carriage assembly 134 and its components, as a whole, are servo-controlled to position the turret 16a, as necessary. In general, the turret 16a and the carriage assembly 134 have two main positions based on the positioning of the turret mounting portion 134a and the wedge portion 134b: an operative position and a non-operative or stored position. The non-operative position is located above and rearwardly of the workpiece 12 relative to the operative position. To locate the turret 16a in the non-operative position, the turret mounting portion 134a travels via the rails 134h along the XY1-axis XY1 upward and rearward from the workpiece 12. Additionally, the wedge portion 134b travels via the rails 134j along the XY2-axis XY2 downward and rearward from the workpiece 12. The combination of the travel of both the turret mounting portion 134a and the wedge portion 134b locates the turret mounting portion 134a having the turret 16a and the wedge portion 134b above and rearwardly from the workpiece 12 for when the turret 16a does not machine the workpiece.

In the operative position, the turret 16a is located to machine the exterior of the workpiece with the selected cutting tool 18. To locate the turret 16 in the operative position, the wedge portion 134b travels via the rails 134j along the XY2-axis XY2 in a forward and upward direction toward the workpiece 12. With the wedge portion 134b in this position, the turret 16a, held by the turret mounting portion 134a, is aligned with the workpiece 12 along the XY1-axis XY1. The turret 16a is in the operative position when the turret mounting portion 134a carrying the turret 16a has traveled forwardly and downwardly along the XY1-axis and the selected cutting tool 18 engages the exterior of the workpiece 12 to machine the workpiece 12.

For a particular exterior machining operation, prior to traveling to the operative position, the turret 16a will rotate to position the desired cutting tool 18 to be aligned with the workpiece 12 along the XY1-axis XY1 when the turret 16a translates to the operative position. The other cutting tools 18 mounted at the circumference of the turret 16a that are not in use are available for selection via further rotation of the turret 16a after the turret 16a is retracted from the operative position.

With reference to FIGS. 1-4, 12, and 13, the steady rest 20 is mounted to the base 11 with the rails 40a therebetween. The steady rest 20 can travel along the Z-axis Z1 via the rails 40a to various axial locations between the headstock 14a and the tailstock 23 to support the workpiece 12. The steady rest 20 is servo-controlled and receives feedback to allow for precise positioning along the Z-axis Z1.

The steady rest 20 can have a typical configuration including a housing 20a and a pair of arms 142 mounted to the housing 20a for opening and closing to grasp and support the exterior of the workpiece 12 while also allowing the workpiece 12 to rotate as it is held by the arms 142. The arms 142 include bearings, rollers, or other known rotational members that engage the workpiece 12 and allow it to rotate as it is held by the arms 142. The arms 142 have at least two positions: a disengaged position and an engaged position. When the arms 142 are in the disengaged position, the arms 142 are pivoted to be spaced from the workpiece 12 via a pivot connection at the steady rest housing 20a so that the arms 142 do not support the workpiece 12. When the arms 142 are in the disengaged position, the steady rest 20 can travel along the rails 40a to various axial positions along the Z-axis Z1.

When the arms 142 are pivoted to the engaged position, the arms 142 grasp the workpiece 12, providing support while allowing the workpiece 12 to rotate as it is held by the arms 142. In the engaged position, the steady rest 20 provides support in the case where the tailstock 23 is disengaged from the workpiece 12, or when added support of the workpiece 12 between the headstock 14a and the tailstock 23 is desired. In some instances when the exterior of the workpiece 12 is being machined, the steady rest 20 may not be necessary or desired. In such cases, the steady rest 20 can disengage from the workpiece 12 and travel to another location along the Z-axis Z1.

With reference to FIGS. 1 and 2, the location of the boring tool 24 at the mounting base portion 28 rather than at the turret 16a allows for an increased longitudinal machining range of the workpiece 12. By mounting the boring tool 24 at the mounting base portion 28, the turret 16a and carriage assembly 134 can travel further toward the headstock 14a without sacrificing the length of the boring tool 24. When the boring tool 24 extended orthogonally from the turret 16a in the prior art, the length of the boring tool was limited to about 210 mm before the travel of the turret 16a toward the headstock 14a was restricted.

With the boring tool 24 mounted adjacent the tailstock 23 at the mounting base portion 28, the length of the boring tool 24 occupies space beyond the supported end 12a of the workpiece 12, rather than occupying space extending orthogonally from the turret 16a. By removing the boring tool 24 from the turret 16a, the turret 16a is generally not restricted from travelling toward the headstock 14a, and the length of the boring tool 24 is not compromised. Furthermore, the turret 16a does not need to travel into the space along the Z-axis Z1 beyond the end of the workpiece 12 with the boring tool 24 attached. Thus, mounting the boring tool 24 adjacent the tailstock 23 allows for deep boring with a long boring tool 24 without typically requiring a reduction in the length of the workpiece 12.

Additionally, by mounting the boring tool 24 at the common support assembly 27, the turret 16a can have a greater number of cutting tools 18 mounted thereon because the boring tool 24 no longer takes up space on the turret 16a. Furthermore, by mounting the boring tool 24 to the boring tool holder 26, the diameter of the boring tool 24 can be increased because it no longer takes up the limited space on the turret 16a, unlike in the prior art where the diameter of the boring tool 24 was minimized to avoid decreasing the area on the turret 16a for mounting of the cutting tools 18 thereon.

Mounting the boring tool 24 in the boring tool holder 26 on the common support assembly 27 also allows for an increased length of supporting the boring tool 24. When the boring tool 24 was mounted at the turret 16a, as described above, the diameter to length ratio was limited to about 1:4.2 before becoming unstable and resulting in chatter. By mounting the boring tool 24 to the boring tool holder 26 having a greater clamping length, the diameter to length ratio can approach about 1:11.5 in some conditions. Thus, the increased diameter of the boring tool 24, in addition to the increased diameter to length ratio afforded by the longer clamping length, results in a longer boring tool 24 without sacrificing the length of the workpiece. As described above, in one approach, the length of the boring tool is about 1145 mm and the length of the workpiece is about 3578, minus chucking length. The increased length of the boring tool 24 relative to the prior art allows for deeper boring without compromising the length of the workpiece 12 or the range of external machining by the turret 16a.

Overall, the turning center 10 includes multiple components capable of engaging and disengaging the workpiece 12 for support or machining at multiple locations depending on the particular machining needs for the workpiece 12. The tailstock 23 can travel toward and away from the workpiece 12 along the Z-axis Z1 to engage and support the workpiece 12, and can also move transverse to the Z-axis Z1 along the X-axis X1. The boring tool 24 can move toward and away from the workpiece 12 along the Z-axis Z1, and can also move transverse along the X-axis X1. The turret 16a can travel along the Z-axis Z1 and also toward and away from the workpiece 12 along XY1-axis to machine the workpiece 12. The turret 16a can also move to a non-operative position rearward of the workpiece 12. The steady rest 20 can travel along the Z-axis Z1 to support the workpiece 12 at various axial locations. Each of these operations are possible without sacrificing the exterior machining range of the workpiece 12, the overall length of the workpiece 12, or depth of boring. These various components and their movements provide for robust and variable machining operations especially advantageous for machining elongate workpieces such as cylindrical workpieces having various deep internally bored cylindrical cavities such as blind bores, through bores for pipes, external machined surfaces, and other machining operations.

Having described the turning center 10 and its components generally, the functionality of the turning center 10 will now be described.

The workpiece 12 is received within the turning center 10 and held at one end by the headstock 14a via the chucking members 14b. The turret 16a is in the non-operative position and the tailstock 23 is in the retracted position. The steady rest 20 engages the workpiece 12 via the arms 142 to support the workpiece 12.

With reference to FIG. 12, to machine the exterior of the workpiece 12, the tailstock 23 is aligned with the corresponding end of the workpiece 12 via the position of the mounting base portion 28, which is translated along the X-axis X1 via the screw drive mechanism 54. The tailstock 23 then translates toward its operative position along the Z-axis Z1 via the translation of the common support carriage 27a along the rails 40a toward the end of the workpiece 12, such that the centering member 23b engages the end of the workpiece 12 to support it. With the workpiece 12 supported by the tailstock 23, the steady rest 20 may be disengaged, if desired, due to the support provided by the tailstock 23. Alternatively, the steady rest 20 may continue to provide additional support to the workpiece 12 at a location between the headstock 14a and the tailstock 23. The steady rest 20 can disengage the workpiece 12 and travel along the Z-axis Z1 to another axial location, if desired, and engage the workpiece 12 at that location to provide the additional support.

The carriage assembly 134 having the turret 16a will translate along the Z-axis Z1 to the desired axial location along the length of the workpiece 12. The wedge portion 134b of the carriage assembly 134 translates to the operative position along the XY2-axis XY2 forwardly toward the workpiece 12. The turret 16a rotates to select the desired cutting tool 18 for machining the exterior surface of the workpiece 12. Once the turret 16a has rotated to position the desired cutting tool 18 in line with the exterior of the workpiece 12, the turret 16a is ready for machining the exterior of the workpiece 12.

If the machining operation requires turning the workpiece 12, the headstock 14a will rotatably drive the workpiece 12 at the desired rotational speed. In one approach the rotational speed of the workpiece is about 2,000 RPM, though other rotational speeds can be used as required. In situations where the steady rest 20 is providing support, the steady rest 20 will allow the workpiece 12 to rotate as it is held by the arms 142. The tailstock 23 provides support via the centering member 23b, which rotates about its axis based on the rotational speed of the workpiece 12 driven by the headstock 14a.

While the workpiece 12 is rotating, the turret 16a translates toward its operative position downwardly and forwardly toward workpiece 12 via the turret mounting portion 134a, which translates along the XY1-axis XY1, and the cutting tool 18 will engage and machine the exterior surface of the workpiece 12. Depending on the desired machining, the tool 18 may repeatedly translate toward and away from the workpiece 12 along the XY1-axis XY1 as necessary via the translation of the turret 16a and the turret mounting portion 134a. Additionally, the turret 16a may translate along the Z-axis Z1 via the longitudinal slide portion 134c of the carriage assembly 134 during machining to machine along the length of the workpiece 12. The turret 16a may also disengage the workpiece 12 and rotate to select another cutting tool 18 and re-engage the workpiece 12 to perform a different exterior machining operation.

During the exterior machining operation performed by the turret 16a, the turret 16a is positioned between the driven end 12b and the supported end 12a of the workpiece 12. At the same time, the boring tool holder 26 is positioned at the opposite side of the supported end 12a.

When exterior machining of the workpiece 12 is complete, the turret 16a and carriage assembly 134 will retract into the non-operative position until such time as it is necessary to machine the exterior of the workpiece 12 again. More specifically, the turret mounting portion 134a having the turret 16a will translate upward and rearward from the workpiece 12 along the XY1-axis XY1, and the wedge portion 134b will translate downward and rearward from the workpiece 12 along the XY2-axis XY2. The headstock 14a will stop rotatably driving the workpiece 12.

Once the workpiece 12 has stopped rotating and the turret 16a is in the non-operative position, the workpiece 12 is ready for interior machining via the boring tool 24. The steady rest 20 will disengage the workpiece 12 and will travel along the Z-axis Z1 toward the end of the workpiece 12 nearest the tailstock 23, wherein the steady rest 20 will engage and support the workpiece 12 with the arms 142.

With the workpiece 12 supported by the steady rest 20, the tailstock 23 will disengage from the end of the workpiece 12 and travel toward the non-operative position. To disengage from the workpiece 12, the common support carriage 27a of the common support assembly 27 will translate along the rails 40a along the Z-axis Z1 toward the right end 10c of the turning center 10.

The tailstock 23 will then translate to its non-operative position via the translation of the mounting base portion 28. The mounting base portion 28 will translate along the X-axis X1 transverse to Z-axis Z1 via the screw drive mechanism 54 toward the rear of the turning center 10. The tailstock 23 is positioned rearward of the central axis of the workpiece 12, and the boring tool 24 is aligned with the end of the workpiece 12. The cutting tip 71 is generally located at about the same point along the Y-axis Y1 as the central axis of the workpiece 12. The position of the cutting tip 71 along the X-axis X1 is determined based on the location along the X-axis X1 that the boring tool 24 is intended to machine. For example, if the boring tool 24 is intended to bore two inches from the central axis of the workpiece 12 to create a four inch diameter bore, the cutting tip 71 will be positioned two inches from the central axis of the workpiece 12. The precise positioning of the cutting tip 71 is based on the position of the mounting base 28, which is positioned via the servo-controlled motor 55 of the screw drive mechanism 54 for precise machining. To position the cutting tip 71 at other locations, the mounting base portion 58 will translate along the X-axis X1 via the screw drive mechanism 54. With the cutting tip 71 in the desired position, the workpiece 12 is ready for boring.

With reference to FIG. 12, to machine the interior of the workpiece 12, the headstock 14a will rotatably drive the workpiece 12 about its central axis at the desired rotational speed. In one approach, the rotational speed of the workpiece is about 2,000 RPM, but other speeds could be used. The steady rest 20, supporting the workpiece 12, will allow the workpiece 12 to rotate at the desired rate as it is held by the arms 142. The boring tool holder 26 having the boring tool 24 will advance toward the end of the workpiece 12 along the Z-axis Z1 via the translation of the base plate 59 along the base plate linear guide bearings 50 while the workpiece 12 is rotating. The base plate 59 is translated along the Z-axis Z1 via the base plate screw drive mechanism 60. When the cutting tip 71 of the boring tool 24 engages the rotating workpiece 12, the boring tool 24 will bore the interior of the workpiece 12. The boring tool 24 will continue to advance into the workpiece 12 to the desired boring depth via the translation of the base plate 59. The increased diameter of the boring tool 24, in addition to the increased support area provided by the boring tool holder 26, allows the boring tool 24 to machine to a generally deeper depth than in the prior art, thereby permitting deep boring.

If desired, the boring tool 24 can retract along its path of advancement via the translation of the base plate 59 to bore along the same path as it did while advancing. Alternatively, at the conclusion of boring to the desired depth, the mounting base portion 28 can translate along the X-axis X1 toward the center of the workpiece 12 such that the boring tool 24 disengages the interior of the workpiece 12. The boring tool holder 26 will then retract via the base plate 59 along the mounting base portion 28 to a non-operative position, where the boring tool 24 is retracted from the interior of the workpiece 12.

At the conclusion of the boring process, the headstock 14a will stop rotatably driving the workpiece 12. At this point, the turning center 10 can perform a subsequent process. For example, if further exterior machining is desired, the mounting base portion 28 can translate along the X-axis X1 to align the tailstock 23 with the central axis of the workpiece 12, and the common support assembly 27 can subsequently translate toward the end of the workpiece 12 bring the tailstock 23 into engagement therewith. The turret 16a can select the desired cutting tool 18, as described above, and return to the operative position and the exterior machining process described above can be similarly performed.

Additionally, if further boring is desired, the mounting base portion 28 can translate again to bring the boring tool 24 in line with the desired boring location, and the boring process described above can be similarly performed.

The order in which the above exterior machining and interior machining processes are performed can be varied to suit the desired needs of the machining process. For example, the interior machining using the boring tool 24 could be performed first. The exterior machining could be performed multiple times with the interior machining occurring periodically between exterior machining steps.

In one approach, because the boring tool 24 is separate from turret 16a, the turret 16a could machine the exterior of the workpiece 12 at the same time that the boring tool 24 is machining the interior of the workpiece 12. In this situation, the selected tool 18 at the turret 16a would be selected to machine the exterior of the workpiece 12 while the workpiece 12 is rotating, due to the rotation required for performing the internal boring operation. In such an approach, the rotational speed required for the boring process would be the same as the rotational speed required for the exterior machining.

While there have been illustrated and described particular embodiments of the present invention, it will be appreciated that numerous changes and modifications will occur to those skilled in the art, and it is intended in the appended claims to cover all those changes and modifications that fall within the true spirit and scope of the present invention.

What is claimed is:

1. A machine tool apparatus comprising:
    a machine base;
    a work holder configured to be secured to one end of a workpiece and having a rotary drive for rotationally driving the workpiece about a central axis thereof, the work holder being mounted to the machine base so that the work holder remains stationary relative to the machine base during machining of an exterior of the workpiece;
    an end work support having a workpiece engaging member configured to support the workpiece at an end opposite the work holder for rotation about a central longitudinal axis of the end work support as the workpiece is driven by the work holder;
    a cutting tool holder configured for holding multiple cutting tools;
    a carriage assembly that supports the cutting tool holder and is mounted to the machine base to be movable along the machine base toward and away from the stationary work holder for shifting the cutting tool holder along the central axis for locating one of the cutting tools therealong and advancing the cutting tool holder toward the workpiece for machining the exterior of the workpiece;
    a boring tool holder having an elongated cylindrical cavity for holding a boring tool, the cylindrical cavity having a central longitudinal axis;
    a common support assembly that supports the end work support and the boring tool holder so that the boring tool holder cylindrical cavity central longitudinal axis is laterally fixed relative to the end work support central longitudinal axis at a fixed lateral distance therebetween, the common support assembly being mounted for travel along the machine base in a direction transverse to the workpiece central axis for selectively aligning either the boring tool holder or the end work support with the end of the workpiece with the central longitudinal axes of the boring tool holder cylindrical cavity and the end work support having the fixed lateral distance therebetween with either the boring tool holder or the end work support aligned with the end of the workpiece to allow the length of the boring tool to be maximized for deep boring.

2. The machine tool apparatus of claim 1 wherein the cutting tool holder comprises a rotatable turret and the boring tool holder comprises a body that is non-rotatable and is separate from the rotatable turret.

3. The machine tool apparatus of claim 1 wherein the common support assembly permits either the end work support or the boring tool holder to be aligned with the end of the workpiece opposite the end secured to the work holder to allow for exterior machining of the workpiece with the cutting tool with the end work support engaging the workpiece end or boring of the workpiece with the boring tool aligned for boring the workpiece end with the end work support shifted away therefrom.

4. The machine tool apparatus of claim 1 further comprising an intermediate work support mounted to the machine base between the work holder and the end work support for travel along the workpiece central axis for engaging and supporting the workpiece when the common support assembly is shifted to align the boring tool for boring.

5. The machine tool apparatus of claim 1 wherein the common support assembly includes a mounting base portion to which the end work support and the boring tool holder are mounted, and a common support carriage having the mounting base portion mounted thereto; and
    linear guide bearings between the mounting base portion and the common support carriage oriented to permit the mounting base portion to shift transverse to the workpiece central axis for aligning either the boring tool holder or the end work support with the corresponding end of the workpiece.

6. The machine tool apparatus of claim 5 wherein the end work support has a housing that is integral with the mounting base portion.

7. A machine tool apparatus comprising:
    a machine base;

a motorless end work support configured for rotatably supporting a workpiece having a central axis extending horizontally at a predetermined height;

a motorless boring tool holder sized to support a boring tool to be disposed at the same predetermined height as the workpiece central axis;

a common support assembly having the motorless end work support and the motorless boring tool holder mounted thereon for shifting relative to the machine base to align either the motorless end work support or the motorless boring tool holder with the workpiece central axis, the motorless boring tool holder being mounted to the common support assembly so that the motorless boring tool holder is not rotatable relative to the common support assembly;

a housing of the motorless end work support mounted to the common support assembly; and a workpiece engaging member of the motorless end work support rotatably mounted to the housing thereof for engaging an end portion of the workpiece and rotating relative to the end work support housing with rotation of the workpiece.

8. The machine tool apparatus of claim 7 wherein:

the common support assembly includes a mounting base portion to which the end work support and the boring tool holder are mounted and a common support carriage to which the mounting base portion is mounted, the mounting base portion and the common support carriage have lateral linear guide bearings therebetween oriented to extend laterally for shifting of the mounting base portion transverse to the workpiece central axis, the common support carriage and the machine base have longitudinal linear guide bearings oriented to extend longitudinally for shifting of the common support carriage along the workpiece central axis to allow the end work support to be shifted both along the workpiece central axis and transverse to the workpiece central axis for selective alignment and engagement with the corresponding end of the workpiece and to allow the boring tool holder to be shifted both along the workpiece central axis and transverse to the workpiece central axis for selective alignment with the corresponding end of the workpiece for allowing the boring tool to be advanced into engagement with the corresponding end of the workpiece.

9. The machine tool apparatus of claim 8 further comprising:

a base plate of the boring tool holder mounted to the mounting base portion having the boring tool holder mounted thereto; and longitudinal linear guide bearings between the base plate and the mounting base portion oriented to extend longitudinally for advancing and retracting the boring tool holder and boring tool toward and away from the workpiece along the central axis thereof.

10. The machine tool apparatus of claim 7 wherein:

the common support assembly has a mounting base portion to which the end work support and the boring tool holder are mounted, and the end work support housing is integral with the mounting base portion.

11. The machine tool apparatus of claim 7 wherein the common support assembly has bearings sized so that the boring tool holder only shifts in a predetermined range of travel along the workpiece central axis that does not overlap the workpiece extending therealong.

12. The machine tool apparatus of claim 7 wherein the boring tool holder and the end work support are disposed laterally adjacent each other on the common support assembly.

13. The machine tool apparatus of claim 7 wherein the boring tool holder has an elongated housing having a cylindrical elongated cavity for receiving an elongated portion of the boring tool therein.

14. A machine tool for cutting an elongate workpiece, the machine tool comprising:

a machine base;

a headstock having a rotary drive configured for holding and rotatably driving a driven end of the elongate workpiece;

a tailstock having a centering mechanism configured for engaging a supported end of the elongate workpiece opposite the driven end thereof;

a steady rest having a workpiece support device configured for supporting the elongate workpiece between the headstock and the tailstock as the workpiece is rotatably driven by the headstock rotary drive;

a turret configured for holding multiple cutting tools for machining an exterior surface of the elongate workpiece;

a single tool holder having only one cavity configured for holding a boring tool for machining an interior surface of the elongate workpiece;

a common support assembly to which the tailstock and the single tool holder are mounted, the single tool holder being the only tool holder mounted to the common support assembly, the common support assembly being mounted for shifting relative to the machine base and is configured to allow the tailstock to engage the supported end when undertaking an exterior surface machining operation or to shift the tailstock to a non-operative position spaced from the workpiece supported end for shifting the single tool holder toward the workpiece supported end for undertaking an interior machining operation with the boring tool; and a carriage assembly for the turret that is mounted for shifting relative to the machine base along the length of the elongate workpiece to permit the turret and the multiple cutting tools thereof to travel along the workpiece and machine the exterior surface of the workpiece.

15. The machine tool of claim 14 wherein:

the common support assembly includes a common support carriage and a mounting base portion of the tailstock and to which the boring tool holder is mounted, the common support carriage and the machine base have longitudinal linear guide bearings therebetween oriented to extend longitudinally for shifting the tailstock to engage the workpiece supported end, and the mounting base portion and the common support carriage have lateral linear guide bearings therebetween oriented to extend laterally for shifting the tailstock to the non-operative position and aligning the single tool holder with the supported end of the elongate workpiece.

16. The machine tool of claim 14, wherein:

the common support assembly includes a mounting base portion for carrying the tailstock and the single tool holder thereon, the single tool holder includes a base plate portion and an elongated tool holding portion mounted thereto, the base plate portion and the mounting base portion have longitudinal linear guide bearings therebetween oriented to extend longitudinally for shifting the single tool holder relative to the tailstock toward the workpiece supported end for undertaking the interior machining operation with the tailstock shifted to the non-operative position.

17. The machine tool of claim 14, wherein the single tool holder is mounted to the common support assembly for shifting between a retracted position away from the supported end of the workpiece and an advanced position toward the supported end of the workpiece while the turret remains in a stationary non-operative position.

18. A method for machining a workpiece, the method comprising:
    holding a first end of a workpiece in a work holder;
    engaging a workpiece engaging member of a motorless end work support with a second end of the workpiece;
    rotationally driving the workpiece about a central axis thereof so that the workpiece engaging member of the motorless end work support rotates relative to a housing of the motorless end work support with rotation of the workpiece;
    advancing a cutting tool holder carrying a cutting tool from an inoperative position toward the workpiece to an operative position to machine the exterior of the workpiece with the cutting tool;
    retracting the cutting tool holder from the workpiece to the inoperative position;
    disengaging the workpiece engaging member of the motorless end work support from the second end of the workpiece;
    laterally shifting a mounting base portion having the housing of the motorless end work support and a boring tool holder mounted thereon relative to the central axis of the workpiece to shift the motorless end work support away from the second end of the workpiece and the boring tool holder toward the second end of the workpiece;
    advancing the boring tool holder along the workpiece central axis from a stored position toward the second end of the workpiece to an operative position;
    machining an interior surface of the second end of the workpiece using a boring tool held by the boring tool holder while the first end of the workpiece is held by the work holder, the cutting tool holder remains in the inoperative position, and the motorless end work support is positioned laterally relative to the boring tool holder such that the boring tool holder is not disposed between the workpiece holder and the motorless end work support during machining of the interior surface of the second end of the workpiece using the boring tool.

19. The method of claim 18 wherein the workpiece engaging member of the end work support is disengaged by translating the end work support in a direction transverse to the central axis of the workpiece.

20. The method of claim 18 further comprising supporting the workpiece with an intermediate support between the work holder and the end work support during exterior machining of the workpiece and when the workpiece engaging member of the end work support is disengaged during interior machining of the workpiece.

21. The method of claim 18 further comprising keeping the end work support fixed in a non-operative position laterally adjacent to the boring tool holder while the boring tool holder is advanced toward the second end of the workpiece to machine the interior surface of the workpiece.

22. The method of claim 18, wherein the cutting tool holder is advanced toward the workpiece to machine the exterior of the workpiece with the cutting tool holder between the driven end and the supported end of the workpiece while the boring tool holder is located at the opposite side of the supported end.

23. The machine tool of claim 14 wherein the carriage assembly and the machine base have longitudinal linear guide bearings therebetween oriented to extend longitudinally for shifting the turret and the multiple cutting tools along the length of the elongate workpiece.

24. The machine tool apparatus of claim 7 wherein the motorless boring tool holder includes a body having portions configured to clamp the boring tool therebetween and fix the boring tool against rotation during a boring operation.

* * * * *